(12) United States Patent
Uchiyama

(10) Patent No.: US 10,517,055 B2
(45) Date of Patent: Dec. 24, 2019

(54) COMMUNICATION DEVICE AND COMMUNICATION METHOD

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/751,939

(22) PCT Filed: Aug. 16, 2016

(86) PCT No.: PCT/JP2016/073902
§ 371 (c)(1),
(2) Date: Feb. 12, 2018

(87) PCT Pub. No.: WO2017/077758
PCT Pub. Date: May 11, 2017

(65) Prior Publication Data
US 2018/0234935 A1    Aug. 16, 2018

(30) Foreign Application Priority Data

Nov. 6, 2015   (JP) .................................. 2015-218644

(51) Int. Cl.
*H04W 4/00*    (2018.01)
*H04W 56/00*    (2009.01)
(Continued)

(52) U.S. Cl.
CPC ......... *H04W 56/0015* (2013.01); *H04L 7/041* (2013.01); *H04W 4/023* (2013.01); *H04W 56/00* (2013.01); *H04W 56/0025* (2013.01)

(58) Field of Classification Search
CPC ...... H04W 72/04; H04W 88/08; H04W 76/00
See application file for complete search history.

(56) References Cited

U.S. PATENT DOCUMENTS

2006/0015245 A1* 1/2006 Janssen .................. G08G 1/054
                                                       701/117
2014/0321358 A1* 10/2014 Tronc ................. H04B 7/18513
                                                       370/317
(Continued)

FOREIGN PATENT DOCUMENTS

WO    2013/080764 A1    6/2013
WO    2015/006082 A1    1/2015
(Continued)

OTHER PUBLICATIONS

Extended European Search Report dated Sep. 19, 2018 in European Application No. 16861827.
(Continued)

*Primary Examiner* — Siren Wei
(74) *Attorney, Agent, or Firm* — Xsensus LLP

(57) ABSTRACT

[Object] To provide innovation with respect to which synchronization signal a communication device uses to conduct a synchronization process.
[Solution] Provided is a communication device including: a selection unit configured to select a synchronization signal from respective synchronization signals received from two or more other devices on a basis of origin information that is acquired by communication with another device and that indicates an origin of a synchronization signal used for acquisition of synchronization timing in the other device; and a synchronization processing unit configured to acquire synchronization timing using the synchronization signal selected by the selection unit.

14 Claims, 16 Drawing Sheets

| V | I | P | H |
|---|---|---|---|
| • Passenger vehicle<br>• Commercial or fleet vehicle<br>• Emergency vehicle<br>• Transit vehicle | • Cellular network<br>• Data centre<br>• Fleet or freight management centre<br>• Traffic management centre<br>• Weather service<br>• Rail operation centre<br>• Parking system<br>Toll system | • Cyclist<br>• Pedestrian shelter<br>• Motorcycle | • Home network<br>• Garage<br>• Enterprise or dealer networks |

(51) Int. Cl.
*H04L 7/04* (2006.01)
*H04W 4/02* (2018.01)

(56) References Cited

U.S. PATENT DOCUMENTS

| | | |
|---|---|---|
| 2015/0009875 A1 | 1/2015 | Khoryaev et al. |
| 2015/0009903 A1 | 1/2015 | Xue et al. |
| 2015/0009948 A1 | 1/2015 | Raaf et al. |
| 2015/0009949 A1 | 1/2015 | Khoryaev et al. |
| 2015/0009964 A1 | 1/2015 | Ellenbeck et al. |
| 2015/0009975 A1 | 1/2015 | Gupta |
| 2015/0280887 A1* | 10/2015 | Ko .................. H04B 1/525 370/330 |
| 2015/0319723 A1* | 11/2015 | Korhonen ........... H04W 56/001 370/350 |
| 2016/0174179 A1* | 6/2016 | Seo .................. H04W 56/0015 370/350 |
| 2016/0212594 A1 | 7/2016 | Morita et al. |
| 2016/0226600 A1 | 8/2016 | Ellenbeck et al. |
| 2016/0286508 A1 | 9/2016 | Khoryaev et al. |
| 2016/0374039 A1* | 12/2016 | Khoryaev ......... H04W 56/0015 |
| 2017/0142741 A1* | 5/2017 | Kaur ................. H04W 56/002 |
| 2018/0092053 A1* | 3/2018 | Lee .......................... H04B 7/04 |

FOREIGN PATENT DOCUMENTS

| | | |
|---|---|---|
| WO | 2015/010542 A1 | 1/2015 |
| WO | 2015/046264 A1 | 4/2015 |
| WO | 2015/116940 | 8/2015 |
| WO | 2015/168931 | 11/2015 |

OTHER PUBLICATIONS

LG Electronics: "Discussion on D2D Synchronization Procedure", 3GPP Draft; RI-140330 Synchronization Procedure LG, 3rd Generation Partnership Project (3GPP), vol. RAN WGI, 20140210-20140214, Feb. 9, 2014.

International Search Report dated Nov. 8, 2016 in PCT/JP2016/073902 filed Aug. 16, 2016.

* cited by examiner

COMMUNICATION DEVICE AND COMMUNICATION METHOD

TECHNICAL FIELD

The present disclosure relates to a communication device and a communication method.

BACKGROUND ART

By utilizing a communication device onboard a mobile object such as a vehicle, direct communication between the mobile object and various target objects is realized. Communication between a communication device onboard a mobile object and various other communication devices is called vehicle-to-X (V2X) communication. For V2X communication, communication systems utilizing dedicated short range communications (DSRC) have been investigated thus far, but recently, investigation into communication systems utilizing mobile phone communication standards such as Long Term Evolution (LTE) is progressing. Note that a system related to the LTE communication standard is disclosed in Patent Literature 1 below, for example.

CITATION LIST

Patent Literature

Patent Literature 1: WO 13/080764

DISCLOSURE OF INVENTION

Technical Problem

In the above V2X communication, the communication device onboard the mobile object may conduct a synchronization process using several types of synchronization signals. For example, the communication device onboard the mobile object may conduct a synchronization process using a synchronization signal transmitted from an LTE base station, or a synchronization signal transmitted from a communication device onboard another mobile object. However, among synchronization signals, the areas in which each synchronization signal is used and the accuracy of each synchronization signal are expected to be different. For this reason, innovation is desired with respect to which synchronization signal a communication device uses to conduct the synchronization process.

Solution to Problem

According to the present disclosure, there is provided a communication device including: a selection unit configured to select a synchronization signal from respective synchronization signals received from two or more other devices on a basis of origin information that is acquired by communication with another device and that indicates an origin of a synchronization signal used for acquisition of synchronization timing in the other device; and a synchronization processing unit configured to acquire synchronization timing using the synchronization signal selected by the selection unit.

In addition, according to the present disclosure, there is provided a communication device including: a synchronization processing unit configured to acquire synchronization timing on a basis of reception of a synchronization signal; and a control unit configured to control transmission of the synchronization signal after the acquisition of the synchronization timing by the synchronization processing unit. The control unit further controls transmission of origin information that indicates an origin of the synchronization signal used for the acquisition of the synchronization timing.

In addition, according to the present disclosure, there is provided a communication method including: selecting, by a processor, a synchronization signal from respective synchronization signals received from two or more other devices on a basis of origin information that is acquired by communication with another device and that indicates an origin of a synchronization signal used for acquisition of synchronization timing in the other device; and acquiring synchronization timing using the selected synchronization signal.

In addition, according to the present disclosure, there is provided a communication method including: acquiring synchronization timing on a basis of reception of a synchronization signal; controlling transmission of a synchronization signal after the acquisition of the synchronization timing; and controlling, by a processor, transmission of origin information that indicates an origin of a synchronization signal used for the acquisition of the synchronization timing.

Advantageous Effects of Invention

According to the present disclosure, as explained above, it is possible to realize innovation with respect to which synchronization signal a communication device uses to conduct the synchronization process. Note that the effects described above are not necessarily limited, and along with or instead of the effects, any effect that is desired to be introduced in the present specification or other effects that can be expected from the present specification may be exhibited.

MODE(S) FOR CARRYING OUT THE INVENTION

Figure 1:
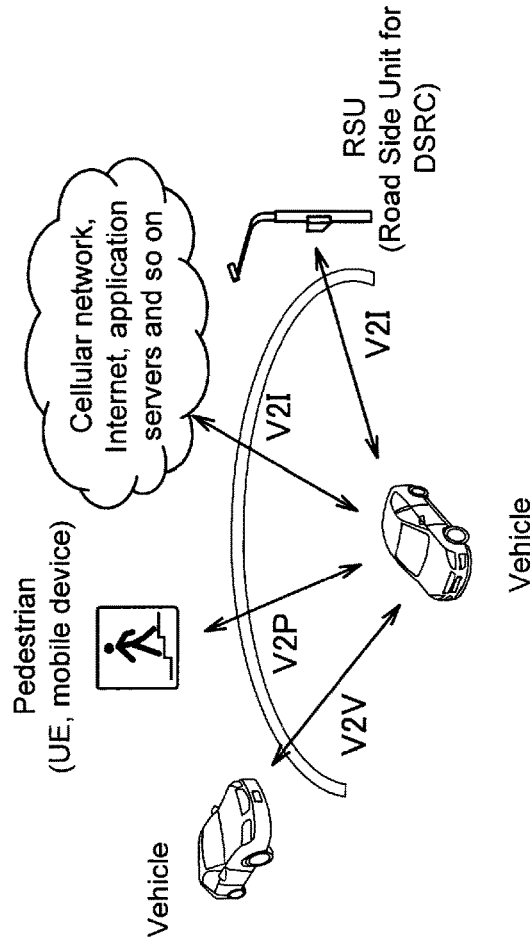
FIG. 1 is an explanatory diagram for describing an overview of V2X communication.

Hereinafter, (a) preferred embodiment(s) of the present disclosure will be described in detail with reference to the appended drawings. Note that in this specification and the appended drawings, structural elements that have substantially the same function and structure are denoted with the same reference numerals, and repeated explanation of these structural elements is omitted.

Also, in this specification and the appended drawings, multiple structural elements having substantially the same function and structure may in some cases be distinguished by different letters appended to the same sign. For example, multiple elements having substantially the same function and structure or logical significance are distinguished as UEs 20A, 20B, 20C, and so on as necessary. On the other hand, in a case of not particularly distinguishing each of multiple structural elements having substantially the same function and structure, only the same sign will be given. For example, in a case of not particularly distinguishing UEs 20A, 20B, and 20C, each of the UEs 20A, 20B, and 20C will be designated simply the UE 20.

In addition, the present disclosure will be described in the order indicated below.
0. Introduction
1. Overview of wireless communication system
2. Configuration of UE and eNB
3. Operation examples
3-1. First operation example
3-2. Second operation example
3-3. Third operation example
4. Applications
5. Conclusion

0. INTRODUCTION

By utilizing a communication device onboard a mobile object such as a vehicle, direct communication between the mobile object and various target objects is realized. Communication between a vehicle and various target objects is called vehicle-to-X (V2X) communication. FIG. 1 is an explanatory diagram for describing an overview of V2X communication. As illustrated in FIG. 1, V2X communication may be vehicle-to-vehicle (V2V) communication, vehicle-to-infrastructure (V2I) communication, vehicle-to-pedestrian (V2P) communication, or vehicle-to-home (V2H) communication, for example.

As illustrated in FIG. 1, the communication target of a vehicle in V2V communication may be a passenger vehicle, a commercial or fleet vehicle, an emergency vehicle, or a transit vehicle, for example. Also, the communication target of a vehicle in V2I communication may be a cellular network, a data centre, a fleet or freight management centre, a traffic management centre, a weather service, a rail operation centre, a parking system, or a toll system, for example. Also, the communication target of a vehicle in V2P communication may be a cyclist, a pedestrian shelter, or a motorcycle, for example. Also, the communication target of a vehicle in V2H communication may be a home network, a garage, or enterprise or dealer networks, for example.

Note that in V2X communication, communication systems utilizing dedicated short range communications (DSRC) have been investigated, but recently, investigation into communication systems utilizing mobile phone communication standards such as Long Term Evolution (LTE) is progressing.

Examples of applications of V2X communication include communication systems intended for forward collision warning, loss of control warning, emergency vehicle warning, emergency stop, adaptive cruise assist, traffic condition warning, traffic safety, automatic parking, route deviation warning, message transmission, collision warning, communication range extension, traffic volume optimization, curve speed alert, pedestrian collision warning, vulnerable person safety, or the like.

The following describes a wireless communication system for conducting communication between User Equipment (UE), which are communication devices onboard vehicles, as such V2X communication.

1. OVERVIEW OF WIRELESS COMMUNICATION SYSTEM

Figure 2:
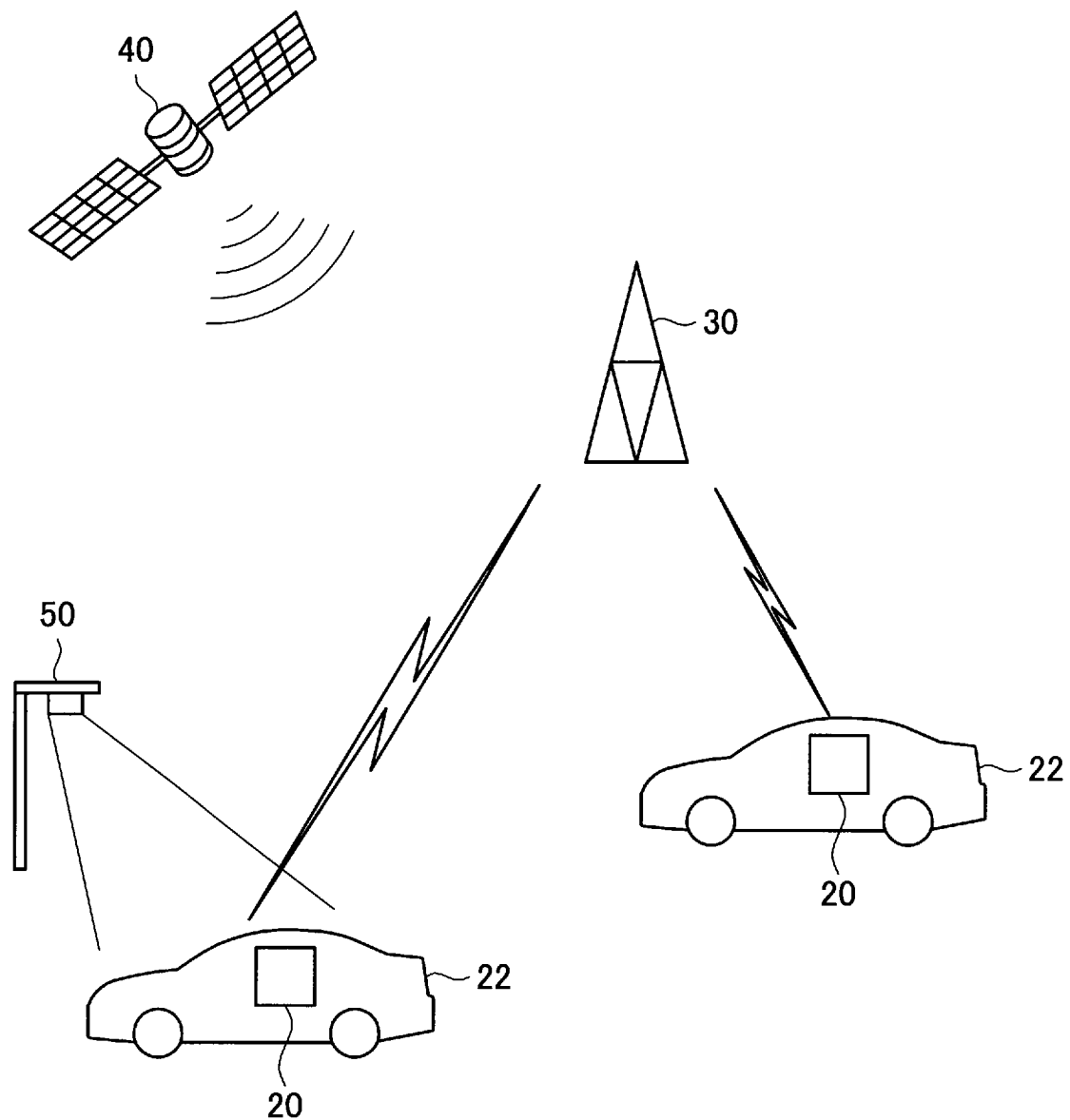
FIG. 2 is an explanatory diagram illustrating a configuration of a wireless communication system according to an embodiment of the present disclosure.

FIG. 2 is an explanatory diagram illustrating a configuration of a wireless communication system according to an embodiment of the present disclosure. As illustrated in FIG. 2, the wireless communication system according to an embodiment of the present disclosure includes a UE 20, a vehicle 22, an eNB 30, a GPS satellite 40, and a roadside unit (RSU) 50.

The eNB 30 is a cellular base station that provides a cellular communication service to the UE 20 positioned inside a cell. For example, the eNB 30 schedules resources for the UE 20 to communicate by, and notifies the UE 20 of the scheduled resources. Additionally, the eNB 30 conducts uplink communication or downlink communication with the UE 20 in the relevant resources.

The GPS satellite 40 is an artificial satellite (communication device) that circles around the earth following a certain orbit. The GPS satellite 40 transmits a Global Navigation Satellite System (GNSS) signal including a navigation message. The navigation message includes various information for position estimation, such as orbit information and time information of the GPS satellite 40.

The RSU 50 is a communication device installed on the roadside. The RSU 50 is able to communicate bidirectionally with the vehicle 22 or the UE 20 onboard the vehicle 22. Note that the RSU 50 may conduct DSRC communication with the vehicle 22 or the UE 20 onboard the vehicle 22, but in the present embodiment, it is anticipated that the RSU 50 also communicates with the vehicle 22 or the UE 20 onboard the vehicle 22 according to a cellular communication method.

The UE 20 is a communication device installed onboard the vehicle 22, and moves as the vehicle 22 travels. The UE 20 has a function of communicating with the eNB 30 under control by the eNB 30. Additionally, the UE 20 has a function of receiving the GNSS signal transmitted from the GPS satellite 40, and estimating position information of the UE 20 from the navigation message included in the GNSS signal. The UE 20 also has a function of communicating with the RSU 50. Furthermore, the UE 20 according to the present embodiment is also capable of communicating directly with a UE 20 onboard another vehicle 22, or in other words, conducting device-to-device (D2D) communication discussed later.

Note that although FIG. 2 illustrates the vehicle 22 as an example of a mobile object, the mobile object is not limited to the vehicle 22. For example, the mobile object may also be an object such as a marine vessel, an aircraft, or a bicycle. In addition, although the above describes the UE 20 as including the function of receiving the GNSS signal, the vehicle 22 may have the function of receiving the GNSS signal, and the vehicle 22 may output a GNSS signal reception result to the UE 20.

(D2D Communication)

At this point, among the elemental technologies used in the wireless communication system discussed above, D2D communication as it relates particularly to an embodiment of the present disclosure will be described more specifically.

—Overview—

D2D communication is direct communication between UEs 20 without going through the eNB 30, for example, and is standardized in 3GPP Release 12. In D2D communication, two communication methods called "Discovery" and "Communication" are supported. "Discovery" is communication used by a UE 20 to notify nearby equipment of the existence of the UE 20, and the data size in "Discovery" is fixed. On the other hand, "Communication" realizes communication using a control signal and a data signal between UEs 20. Such D2D is standardized for public safety purposes, but the usage of D2D is not limited to public safety, and the application of D2D to SNS, game, M2M, automotive scenarios, and the like is also expected.

—Communication Modes—

In D2D, various communication modes are anticipated. For example, a communication mode in which both UEs 20 conducting D2D communication are included in a coverage C is called "In-coverage", while a communication mode in which one of the UEs 20 conducting D2D communication is included in the coverage C is called "Partial-coverage", and a communication mode in which both of the UEs 20 conducting D2D communication are not included in the coverage C is called "Out-of-coverage". A specific example regarding this point will be described with reference to FIG. 3.

Figure 3:
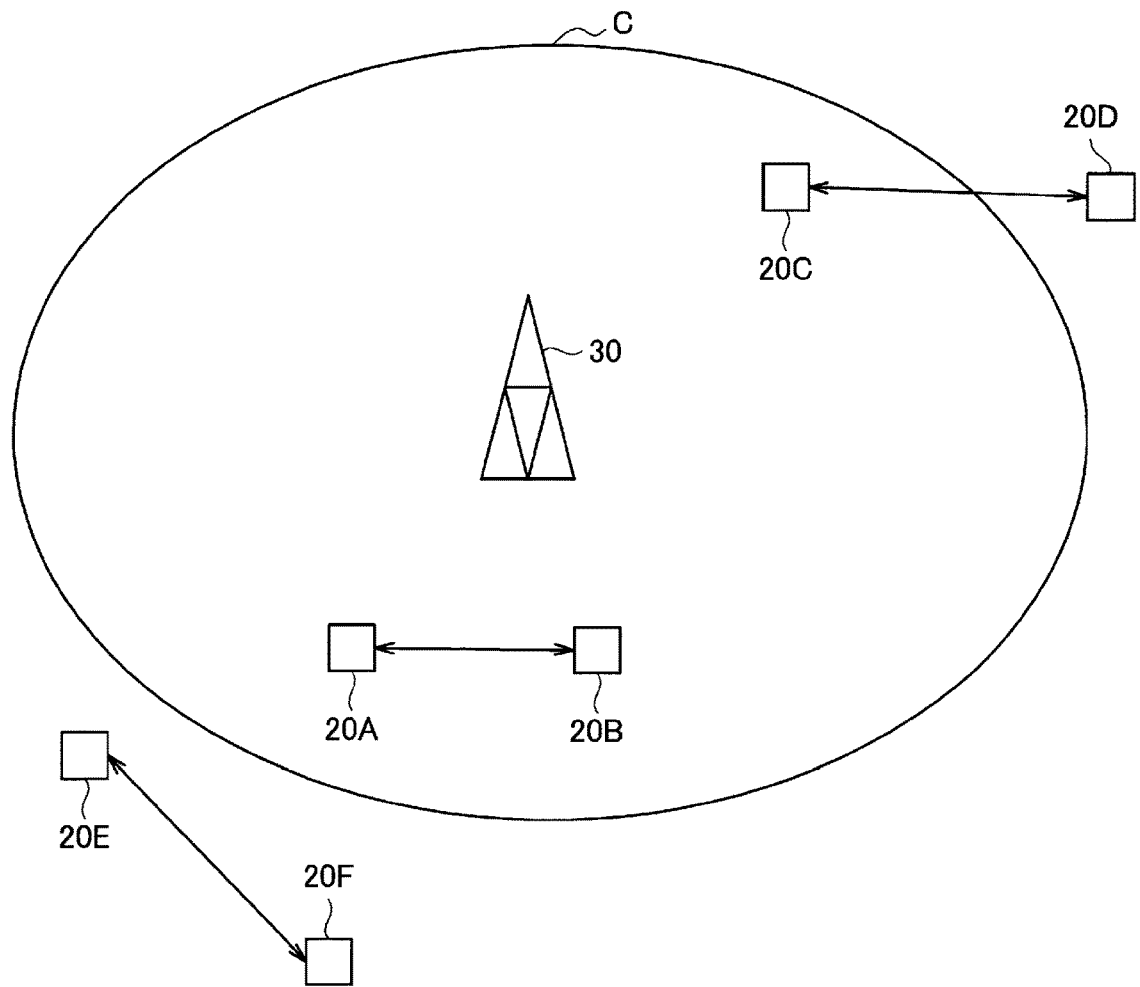
FIG. 3 is an explanatory diagram illustrating an example of D2D communication modes.

FIG. 3 is an explanatory diagram illustrating an example of D2D communication modes. In the example illustrated in FIG. 3, UEs 20A, 20B, and 20C are positioned inside the coverage C of the eNB 30, while UEs 20D, 20E, and 20F are positioned outside the coverage C of the eNB 30. Herein, since both the UEs 20A and 20B are included in the coverage C, the D2D communication conducted by the UEs 20A and 20B is "In-coverage". Since only the UE 20C is included in the coverage C, the D2D communication conducted by the UEs 20C and 20D is "Partial-coverage". Since both the UEs 20E and 20F are not included in the coverage C, the D2D communication conducted by the UEs 20E and 20F is "Out-of-coverage".

In "In-coverage" or "Partial-coverage", the UE 20 is able to conduct D2D communication under control by the eNB 30. On the other hand, in "Out-of-coverage", the UE 20 realizes D2D communication without control by the eNB 30.

Note that although the above illustrates one-to-one communication modes, the communication modes in D2D are not limited to being one-to-one. For example, in D2D, besides one-to-one communication modes called "Unicast Communication", one-to-many communication modes called names such as "Broadcast Communication" and "Group Cast Communication" are also supported.

—Communication Control—

In "In-coverage" or "Partial-coverage", D2D communication between UEs 20 is controlled according to a control signal transmitted from the eNB 30. The control of D2D communication by the eNB 30 will be described with reference to FIG. 4.

Figure 4:
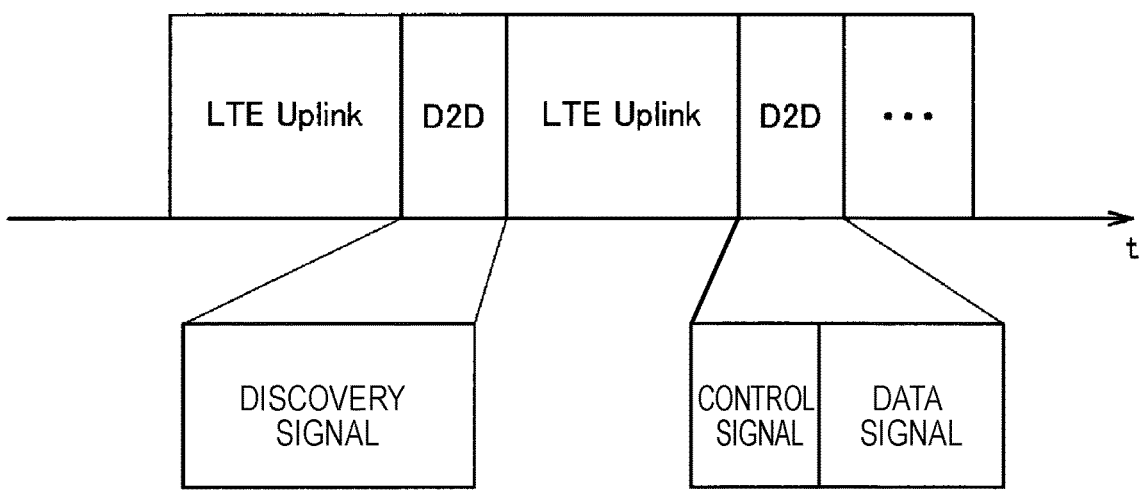
FIG. 4 is an explanatory diagram illustrating control of D2D communication by an eNB.

FIG. 4 is an explanatory diagram illustrating control of D2D communication by the eNB 30. As illustrated in FIG. 4, resources for D2D communication are mapped by time-division with resources for LTE uplink, as illustrated in FIG. 4. The resources for D2D communication are partitioned in units called resource pools, and "Discovery" or "Communication" is conducted inside each resource pool. As illustrated in FIG. 4, a discovery signal is transmitted in the resource pool for "Discovery", while a data signal and a control signal for controlling the communication of the data signal are transmitted in the resource pool for "Communication". Note that the above discovery signal, control signal, and data signal are defined as the Physical Sidelink Discovery Channel (PSDCH), the Physical Sidelink Control Channel (PSCCH), and the Physical Sidelink Shared Channel (PSSCH), respectively.

On the other hand, in "Out-of-coverage", since the control signal from the eNB 30 does not reach either of the UEs 20 conducting D2D communication, the UE 20 conducts D2D communication using parameters preset in the UE 20.

—Synchronization—

Multiple UEs 20 are able to conduct D2D communication by synchronizing with each other. The synchronization signals used for the synchronization of the UE 20 may be the Primary Sidelink Synchronization Signal (PSSS) and the Secondary Sidelink Synchronization Signal (SSSS). The synchronization signal is mapped across six resource blocks of the center frequency with a 40 ms period. Near the synchronization signal, signals such as the Physical Sidelink Broadcast Channel (PSBCH) and the Demodulation Reference Signal (DMRS) are also mapped. Note that priorities on the usage of synchronization signals are defined as follows.

1. eNBs that meet the Scriterion
2. UEs within network coverage*
3. UEs out of network coverage transmitting D2DSS from D2DSSue_net*
4. UEs out of network coverage transmitting D2DSS from D2DSSue_oon*

If none of the above are selected, the UE uses its own internal clock.

2. CONFIGURATION OF UE AND ENB

The above thus describes an overview of a wireless communication system according to an embodiment of the present disclosure. Next, FIG. 5 will be referenced to describe a configuration of the UE 20 and the eNB 30 included in the wireless communication system.

Figure 5:
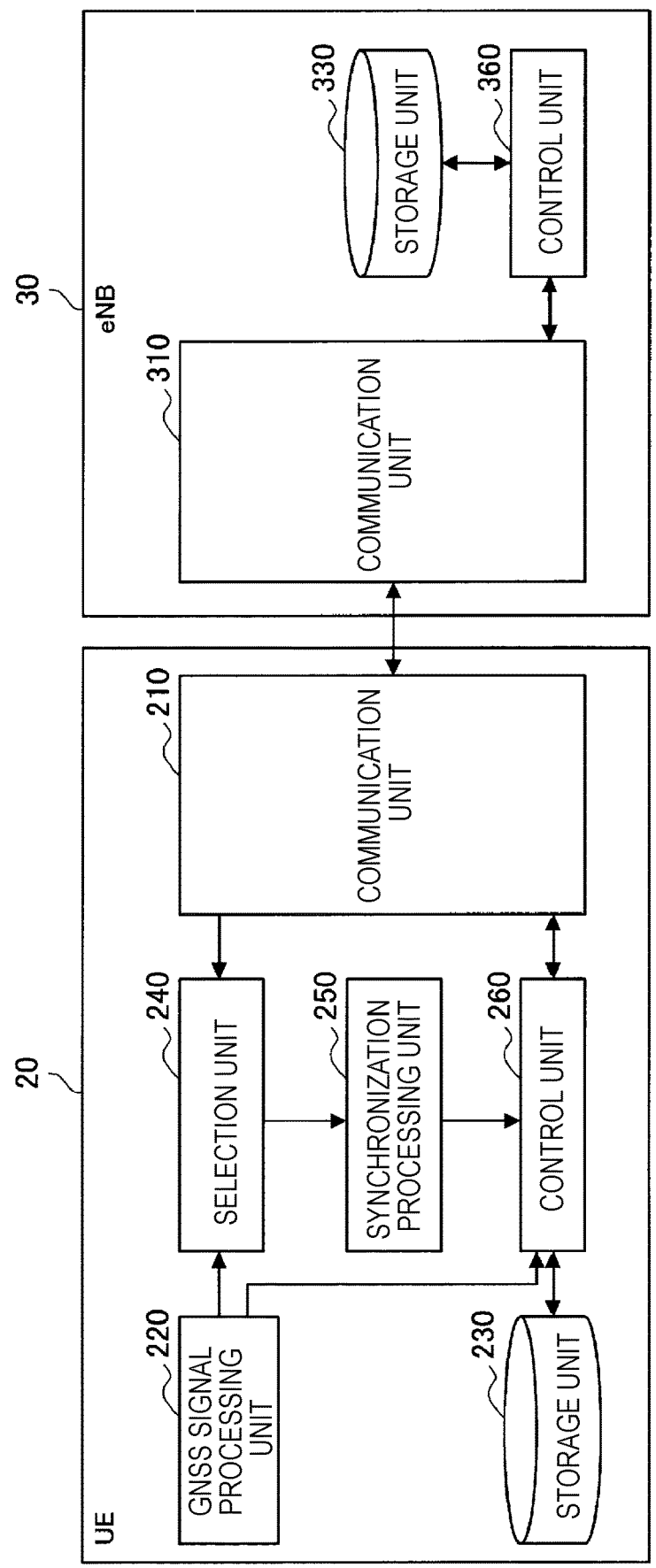
FIG. 5 is an explanatory diagram illustrating a configuration of a UE and an eNB according to an embodiment of the present disclosure.

FIG. 5 is an explanatory diagram illustrating a configuration of the UE 20 and the eNB 30 according to an embodiment of the present disclosure. As illustrated in FIG. 5, the UE 20 is equipped with a communication unit 210, a GNSS signal processing unit 220, a storage unit 230, a selection unit 240, a synchronization processing unit 250, and a control unit 260. Also, the eNB 30 is equipped with a communication unit 310, a storage unit 330, and a control unit 360.

(UE 20)

The communication unit 210 of the UE 20 is an interface with other communication devices, and communicates various signals with other communication devices. For example, the communication unit 210 receives signals such as the synchronization signal, the control signal, and the data signal from the eNB 30. Note that the communication unit 210 is also capable of communicating with other UEs 20 and the RSU 50. For this reason, the communication unit 210 may receive synchronization signals from multiple communication devices such as other UEs 20, the eNB 30, and the RSU 50.

The GNSS signal processing unit 220 processes a GNSS signal transmitted from the GPS satellite 40. For example, the GNSS signal processing unit 220 processes the GNSS signal to thereby estimate position information and time information of the UE 20. Note that the synchronization processing unit 250 discussed later is also capable of conducting a synchronization process based on time information estimated from the GNSS signal, and thus in the present disclosure, the GNSS signal or the time information included in the GNSS signal is also treated as a synchronization signal.

The storage unit 230 stores information used in operations of the UE 20. For example, the storage unit 230 may store information such as parameters and programs used for control by the control unit 260, and map information indicating geographical features and road layouts.

The selection unit 240 selects a synchronization signal to be used for the synchronization process from among one or multiple synchronization signals received from other communication devices. The inventor of the present disclosure made innovations particularly with respect to the design of the selection unit 240 so that a suitable synchronization signal is selected in the selection unit 240, and as a result, devised several designs of the selection unit 240. These several designs of the selection unit 240 will be described specifically and in detail in <3. Operation examples>.

The synchronization processing unit 250 conducts a synchronization process based on the synchronization signal selected by the selection unit 240, and acquires synchronization timings. As a result, the UE 20 becomes synchronized with the device that transmitted the synchronization signal, thereby enabling the UE 20 to conduct D2D communication with the device that transmitted the synchronization signal.

The control unit 260 controls overall operation of the UE 20. For example, after the synchronization process is conducted by the synchronization processing unit 250, or if no synchronization signal is received, the control unit 260 controls the transmission of a synchronization signal by the communication unit 210.

(eNB 30)

The communication unit 310 of the eNB 30 is an interface with other communication devices, and communicates various signals with other communication devices. For example, the communication unit 310 transmits signals such as the synchronization signal, the control signal, and a downlink data signal to the UE 20, and receives an uplink data signal from the UE 20. Also, similarly with the RSU 50, the communication unit 310 is also able to transmit signals such as the synchronization signal, the control signal, and a downlink data signal to the RSU 50, and receive an uplink data signal from the RSU 50.

The storage unit 330 stores information used in operations of the eNB 30. For example, the storage unit 330 may store information such as parameters and programs used for control by the control unit 360, and map information indicating geographical features and road layouts.

The control unit 360 controls overall operation of the eNB 30. For example, the control unit 360 performs various controls, such as a function of allocating resources to the UE 20, random access control, paging control, and transmission of power control.

3. OPERATION EXAMPLES

Hereinafter, a configuration of the UE 20 and the eNB 30 according to an embodiment of the present disclosure will be described. Subsequently, operation examples according to an embodiment of the present disclosure will be described successively in detail.

3-1. First Operation Example

—Introduction—

The UE 20 onboard the vehicle 22 moves as the vehicle 22 travels. For this reason, the type of device that transmits a synchronization signal receivable by the UE 20 changes as the vehicle 22 travels. For example, in an unshielded area, the UE 20 may receive the GNSS signal (synchronization signal) from the GPS satellite 40. Also, in an unshielded area which is also inside the cell of the eNB 30, the UE 20 may also receive a synchronization signal from the eNB 30. On the other hand, in a shielded area, another UE 20 may transmit a synchronization signal due to the other UE 20 being unable to receive a synchronization signal from either the eNB 30 or the GPS satellite 40, and in this case, the UE 20 may receive a synchronization signal from the other UE 20. Furthermore, near the border between an unshielded area and a shielded area, the UE 20 may receive a synchronization signal from any of the GPS satellite 40, the eNB 30, and the other UE 20.

Herein, the shielded area above may be a tunnel or an underground passage, for example. Accordingly, for the sake of a more specific understanding, the synchronization conditions near a tunnel will be described with reference to FIG. 6.

Figure 6:
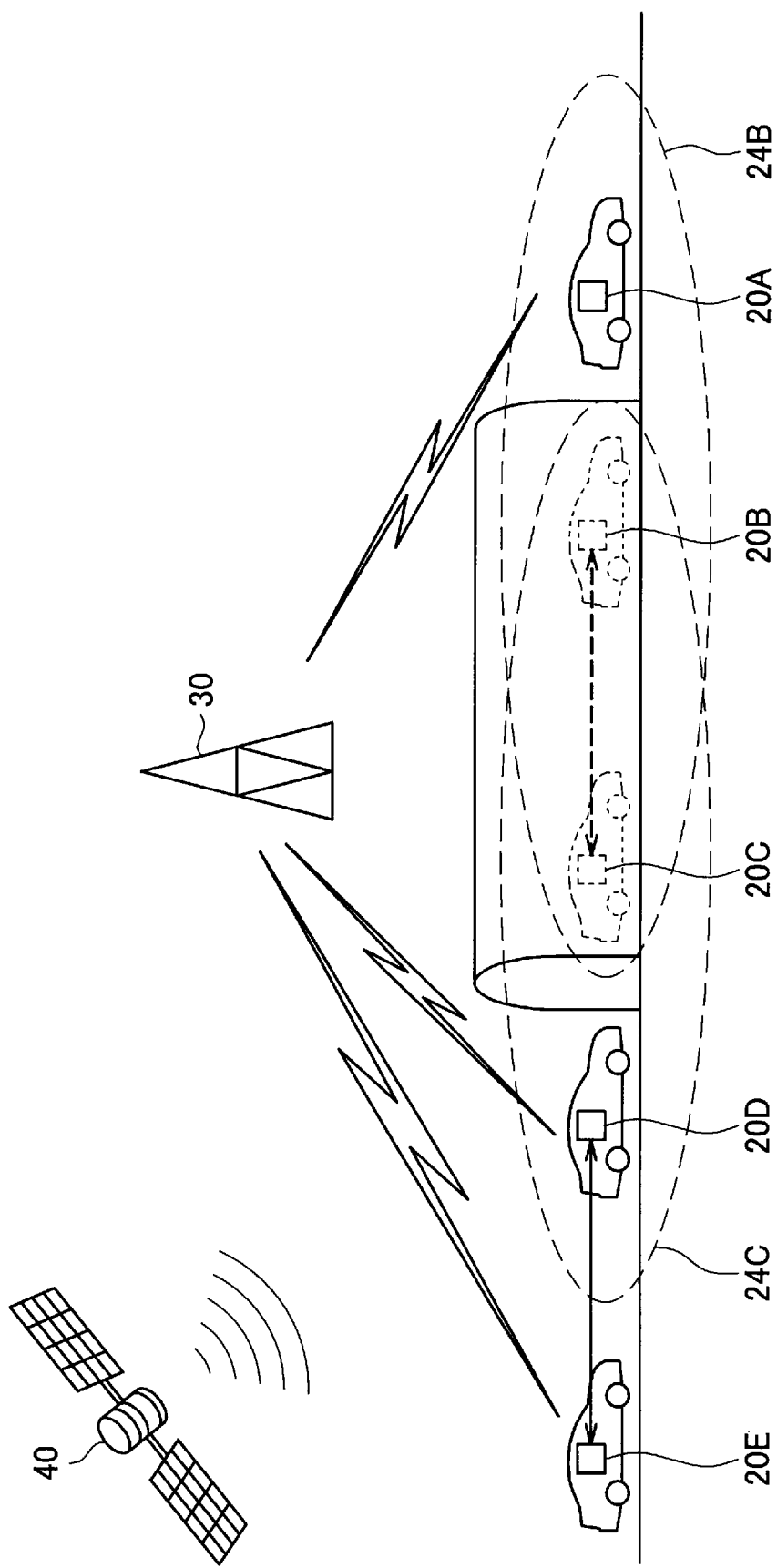
FIG. 6 is an explanatory diagram illustrating synchronization conditions near a tunnel.

FIG. 6 is an explanatory diagram illustrating synchronization conditions near a tunnel. In the example illustrated in FIG. 6, the UEs 20B and 20C are moving inside the tunnel, the UE 20A is coming out of the tunnel, and the UEs 20D and 20E are proceeding into the tunnel. At this point, a synchronization signal from either the eNB 30 or the GPS satellite 40 does not reach the UEs 20B and 20C moving inside the tunnel, and thus D2D communication between the UEs 20 20B and 20C is realized by the UE 20B or 20C transmitting a synchronization signal, as illustrated in FIG. 6. Also, synchronization signals from the eNB 30 and the GPS satellite 40 reach the UEs 20D and 20E, and thus FIG. 6 illustrates an example in which the UEs 20D and 20E conduct D2D communication by using the synchronization signal from the eNB 30 or the GPS satellite 40.

However, the UE 20D positioned near the boundary of the tunnel is included in the coverage 24C of the synchronization signal transmitted by the UE 20C, and thus the UE 20D is also able to receive the synchronization signal from the UE 20C. Similarly, the UE 20A positioned near the boundary of the tunnel is included in the coverage 24B of the synchronization signal transmitted by the UE 20B, and thus the UE 20A is able to receive synchronization signals from the GPS satellite 40, the eNB 30, and the UE 20B.

In this way, in a case where synchronization signals are received from multiple types of devices, it is desirable to appropriately select the synchronization signal to be used in the synchronization process. Hereinafter, as a first operation example, an operation for appropriately selecting a synchronization signal in a case where synchronization signals are received from multiple types of devices will be described. Note that in the following description of the first operation example, the UE 20 will be described as a device of the first type, while the eNB 30 or the GPS satellite 40 related to a system that provides a service in a wider range than the device of the first type does will be described as a device of the second type.

—Main Issue—

According to one perspective, to enable the UE 20 to conduct D2D with a larger number of other UEs 20, it is desirable to synchronize to a global synchronization signal transmitted by the eNB 30 or the GPS satellite 40, rather than a local synchronization signal transmitted by another UE 20. However, if the UE 20 enters a tunnel, the global synchronization signal no longer reaches, and thus synchronization becomes unstable temporarily until synchronization is conducted with a local synchronization signal.

Accordingly, the selection unit 240 of the UE 20 according to the present operation example selects a synchronization signal based on a determination of whether or not the movement of the UE 20 is proceeding toward an area where the synchronization signals from the eNB 30 and the GPS satellite 40 do not reach. For example, if the movement of the UE 20 is proceeding toward an area where the synchronization signals from the eNB 30 and the GPS satellite 40 do not reach, the selection unit 240 may select a local synchronization signal transmitted by another UE 20. According to such a configuration, it is possible to ensure the stability of synchronization, even when the movement of the UE 20 arrives at the above area. On the other hand, if the movement of the UE 20 is proceeding out of an area where the synchronization signal from the eNB 30 or the GPS satellite 40 does not reach, the selection unit 240 may select a global synchronization signal transmitted by the eNB 30 or the GPS satellite 40. According to such a configuration, it is possible to change from the selection of a local synchronization signal to the selection of a global synchronization signal at an earlier point in time. In this way, the gist of the present operation example is that in a case where the UE 20 is positioned in a region containing both a local synchronization signal and a global synchronization signal, the UE 20 does not select a synchronization signal rigidly, but instead selects a synchronization signal appropriately according to the movement conditions of the UE 20. Hereinafter, this point will be described more specifically with the example of FIG. 6.

In the example illustrated in FIG. 6, the UE 20A and the UE 20D are positioned in a region containing both a local synchronization signal and a global synchronization signal. At this point, the UE 20D is proceeding into the tunnel, which is an example of an area where the synchronization signals from the eNB 30 and the GPS satellite 40 do not reach. Accordingly, the selection unit 240 of the UE 20D may select the local synchronization signal transmitted by the other UE 20C. Meanwhile, the UE 20A is coming out of the tunnel. Accordingly, the UE 20A may select the global synchronization signal transmitted by the eNB 30 or the GPS satellite 40, so as to be able to conduct D2D communication with a larger number of other UEs 20.

Herein, the determination of whether or not the UE 20 is proceeding into a tunnel may be conducted by a variety of agents. Additionally, the determination of whether or not the UE 20 is proceeding into a tunnel may be conducted by a variety of techniques. Hereinafter, several examples will be described for the flow of a process that includes a determination of whether or not the UE 20 is proceeding into a tunnel.

—Details—

1)

Figure 7:
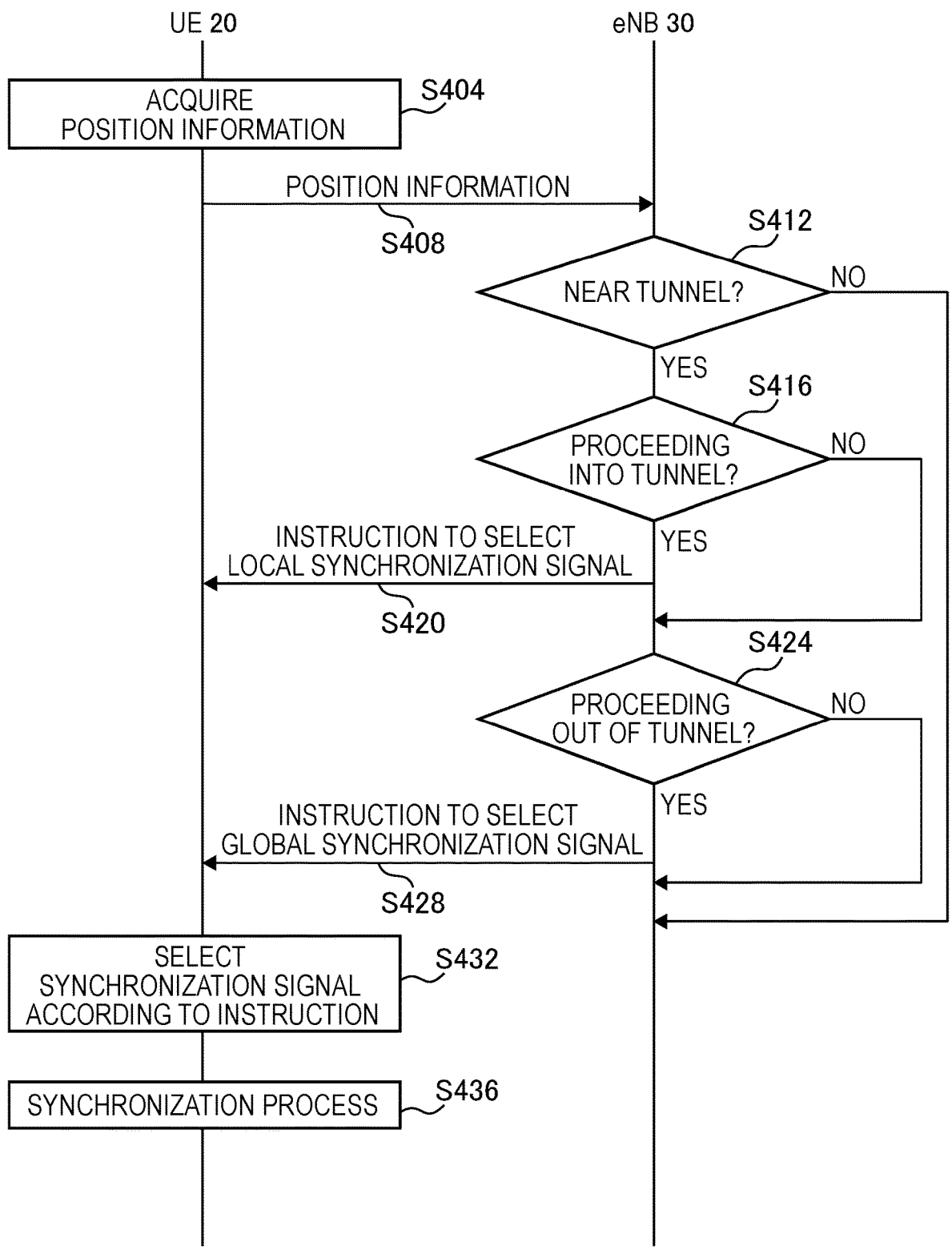
FIG. 7 is an explanatory diagram illustrating a flow of a process of a first operation example.

First, FIG. 7 will be referenced to describe the flow of a process in a case in which the eNB 30 makes the determination of whether or not the UE 20 is proceeding into a tunnel. Note that the process of the eNB 30 illustrated in FIG. 7 may also be conducted by the RSU 50.

FIG. 7 is an explanatory diagram illustrating a flow of a process of the first operation example. As illustrated in FIG. 7, first, the GNSS signal processing unit 220 of the UE 20 acquires position information (S404), and the communication unit 210 of the UE 20 transmits the position information of the UE 20 to the eNB 30 (S408). Note that the position information of the UE 20 may also be acquired by a GNSS signal processing unit provided in the vehicle 22.

The control unit 360 of the eNB 30 determines, based on the position information received from the UE 20, whether or not the UE 20 is positioned in a region containing both a local synchronization signal and a global synchronization signal, such as whether or not the UE 20 is positioned near a tunnel, for example (S412). The control unit 360 may make the determination by referencing map information stored in the storage unit 330. At this point, if it is determined that the UE 20 is not positioned near a tunnel (S412/no), the eNB 30 does not transmit any particular instruction about a synchronization signal to the UE 20.

On the other hand, if it is determined that the UE 20 is positioned near a tunnel (S412/yes), the eNB 30 instructs the UE 20 to select a local synchronization signal if the movement of the UE 20 is proceeding into the tunnel (S416/yes, S420). Conversely, the eNB 30 instructs the UE 20 to select a global synchronization signal if the movement of the UE 20 is proceeding out of the tunnel (S424/yes, S428). Note that the eNB 30 may issue the above instruction in the SIB or the DCI of a Uu link.

Subsequently, the selection unit 240 of the UE 20 selects a synchronization signal according to the instruction from the eNB 30 (S432), and the synchronization processing unit 250 of the UE 20 conducts the synchronization process using the synchronization signal selected by the selection unit 240 (S436).

2)

Figure 8:
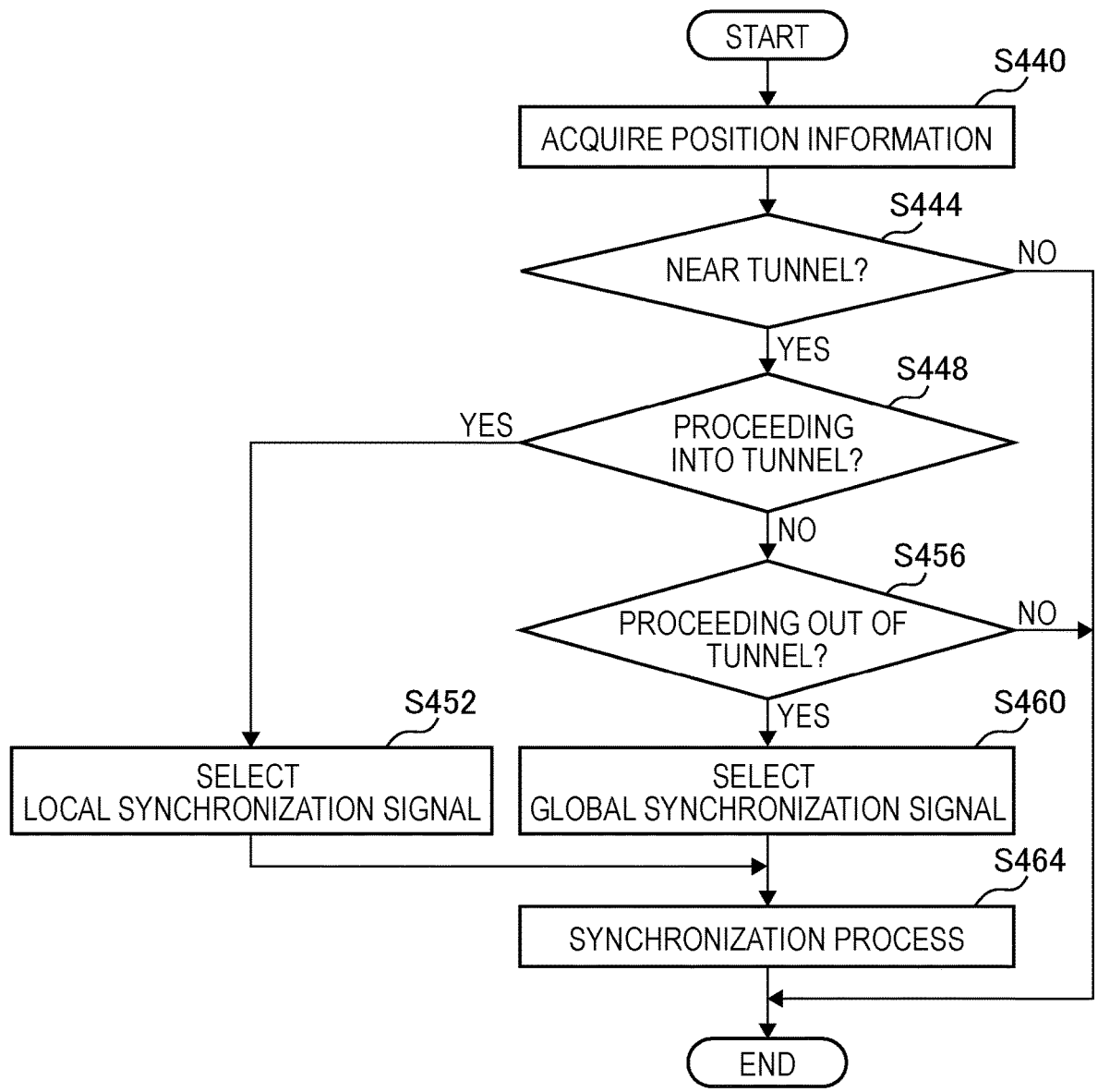
FIG. 8 is an explanatory diagram illustrating another flow of a process of a first operation example.

Next, FIG. 8 will be referenced to describe the flow of a process in a case in which the UE 20 itself makes the determination of whether or not the UE 20 is proceeding into a tunnel.

FIG. 8 is an explanatory diagram illustrating another flow of a process of the first operation example. As illustrated in FIG. 8, first, the GNSS signal processing unit 220 of the UE 20 acquires position information (S440), and the selection unit 240 determines whether or not the UE 20 is positioned in a region containing both a local synchronization signal and a global synchronization signal, such as whether or not the UE 20 is positioned near a tunnel, for example (S444). The selection unit 240 may make the determination by referencing map information (local dynamic mapping (LDM), for example) stored in the storage unit 230. At this point, if it is determined that the UE 20 is not positioned near a tunnel, the selection unit 240 maintains the selection of the currently selected synchronization signal.

On the other hand, if it is determined that the UE 20 is positioned near a tunnel (S444/yes), the selection unit 240 selects a local synchronization signal if the movement of the UE 20 is proceeding into the tunnel (S448/yes, S452). Conversely, the selection unit 240 selects a global synchronization signal if the movement of the UE 20 is proceeding out of the tunnel (S456/yes, S460). The synchronization processing unit 250 of the UE 20 conducts the synchronization process using the synchronization signal selected by the selection unit 240 (S464).

3)

Furthermore, the eNB 30 provides the UE 20 with information for selecting a synchronization signal in the UE 20, and the selection unit 240 of the UE 20 may select a synchronization signal based on this information. In other words, the UE 20 may provide position information to the eNB 30, and the eNB 30 may determine factors such as whether or not the UE 20 is proceeding into a tunnel as discussed above, and depending on the determination result, provide the UE 20 with information for selecting a synchronization signal in the UE 20. The information for selecting a synchronization signal may be information such as received signal strength bias information, changeover probability, and priority table information. For example, if the selection of a local synchronization signal is desired, the eNB 30 may set the received signal strength bias information, which is used by the UE 20 to determine if the reception of the synchronization signal was successful, to a high level for the global synchronization signal and to a low level for the local synchronization signal, and notify the UE 20 of the set bias information. Alternatively, in a case in which the UE 20 generates a random number and changes the synchronization signal in a case where the random number exceeds a threshold value, the eNB 30 may transmit information indicating the above threshold value to the UE 20 as a changeover probability. Alternatively, if the selection of a local synchronization signal is desired, the eNB 30 may transmit to the UE 20 a priority table indicating a higher priority for the local synchronization signal than the global synchronization signal.

4)

Also, as a modification, the RSU 50 that transmits a synchronization signal changeover instruction may be installed near the entrance and also near the exit of an area such as a tunnel or an underground passage. For example, the RSU 50 near the entrance of the area may periodically broadcast a changeover signal for changing over to a local synchronization signal, while the RSU 50 near the exit of the area may periodically broadcast a changeover signal for changing over to a global synchronization signal. According to such a configuration, smooth changeover of the synchronization signal may be realized without making a software-based determination based on position information in the eNB 30 or the UE 20.

In addition, the movement conditions of the UE 20 may also be determined based on a lane ID indicating which road the UE 20 is moving along. The UE 20 or the vehicle 22 transmits position information to the eNB 30, and may receive a lane ID corresponding to the position information from the eNB 30, or receive a lane ID from the RSU 50. Also, the movement conditions of the UE 20 may also be determined from an RARP or RSRQ measurement value of the eNB 30 in the UE 20. For example, if the RSRP/RSRQ is smaller than a certain threshold value, it may be determined that the UE 20 is about to go outside the network (enter the tunnel). Additionally, the movement conditions of the UE 20 may also be determined from the magnitude of change (degradation) in the RSRP/RSRQ. For example, if a sustained degradation in the RSSP/RSRQ can be confirmed, it may be determined that the UE 20 is heading outside the network.

3-2. Second Operation Example

The above thus describes a first operation example according to an embodiment of the present disclosure. Next, a second operation example according to an embodiment of the present disclosure will be described. The second operation example is an example in which a synchronization signal is selected from among multiple synchronization signals based on the origin of each synchronization signal. Hereinafter, an overview of the second operation example will be described, and then the second operation example will be described in detail.

—Introduction—

If a communication device acquires synchronization timings based on a synchronization signal transmitted from another communication device, the communication device may transmit a synchronization signal in accordance with the synchronization timings. Furthermore, based on the synchronization signal transmitted by this communication device, yet another downstream communication device may acquire synchronization timings. This relaying of synchronization timings via synchronization signals will be described specifically with reference to FIG. 9.

Figure 9:
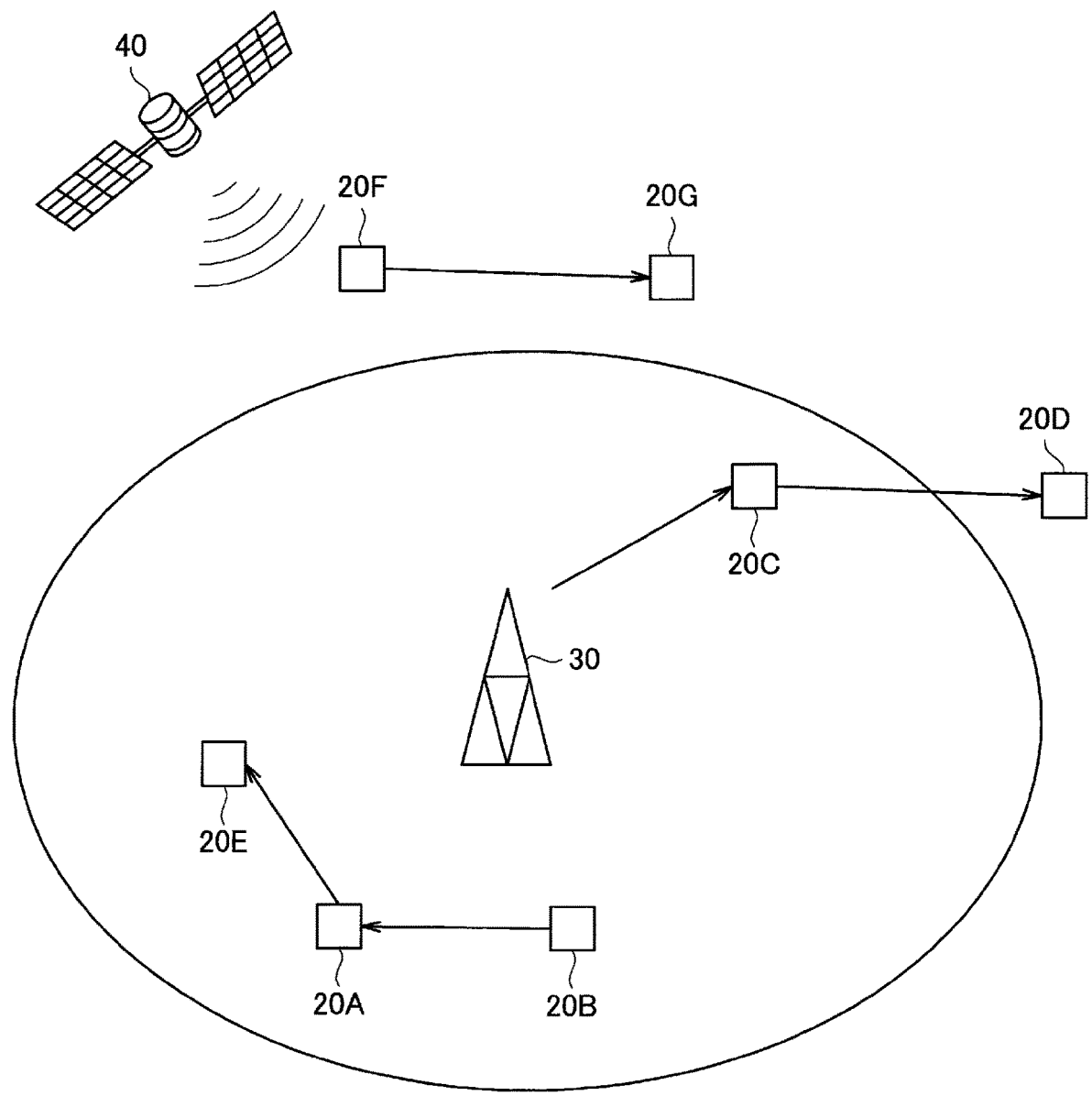
FIG. 9 is an explanatory diagram illustrating a specific example of communication modes in a wireless communication system.

FIG. 9 is an explanatory diagram illustrating a specific example of communication modes in a wireless communication system. In the example illustrated in FIG. 9, the UE 20A receives a synchronization signal from the UE 20B which acts as a source device (the source of the synchronization signal and synchronization timings). The UE 20A acquires synchronization timings based on the synchronization signal, and transmits the synchronization signal, while the UE 20E uses the synchronization signal transmitted from the UE 20A to acquire synchronization timings. At this point, the UEs 20A, 20B, and 20E share synchronization timings. In other words, the synchronization timings originating from the UE 20B may be considered to be relayed to the UE 20E by the UE 20A.

Also, in the example illustrated in FIG. 9, the UE 20C receives a synchronization signal from the eNB 30 which acts as a source device, acquires synchronization timings based on the synchronization signal, and transmits a synchronization signal. Additionally, the UE 20D uses the synchronization signal transmitted from the UE 20C to acquire synchronization timings. At this point, the UE 20D is positioned outside the radio coverage of the eNB 30, but is able to acquire the synchronization timings of the eNB 30 that acts as a source device through the interposition of UE 20C.

Also, in the example illustrated in FIG. 9, the UE 20F receives a synchronization signal (GNSS signal) from the GPS satellite 40 which acts as a source device, acquires synchronization timings based on the synchronization signal, and transmits a synchronization signal. Additionally, the UE 20G uses the synchronization signal transmitted from the UE 20F to acquire synchronization timings. In other words, the UE 20G acquires the synchronization timings of the GPS satellite 40 that acts as a source device.

However, each UE 20 may receive multiple synchronization signals from different types of source devices. For example, the UE 20E illustrated in FIG. 9 may receive a synchronization signal from another UE acting as a source device (the UE 20B), as well as a synchronization signal from the eNB 30 acting as a source device, and a synchronization signal from the GPS satellite 40 acting as a source device.

For this reason, it is desirable to appropriately select the synchronization signal to be used in the synchronization process from among multiple synchronization signals from different types of source devices. Hereinafter, as a second operation example, an operation for appropriately selecting a synchronization signal to be used in the synchronization process from among multiple synchronization signals from different types of source devices will be described. Note that in the following description of the second operation example, the eNB 30 will be described as a device of the first type, while the GPS satellite 40 related to a system that provides a service in a wider range than the device of the first type does will be described as a device of the second type.

—Main Issue—

As also described in the first operation example, according to one perspective, to enable the UE 20 to conduct D2D with a larger number of other UEs 20, it is desirable to operate according to the synchronization timings of the eNB 30 or the GPS satellite 40 acting as the source device. However, it is difficult to ascertain the source device from information indicating the immediately previous device that transmitted the synchronization signal.

For this reason, in a case where a communication device such as the UE 20 or the RSU 50 according to the present operation example acquires synchronization timings based on the reception of a synchronization signal from another communication device, and transmits a synchronization signal in accordance with these synchronization timings, origin information indicating the origin of the synchronization signal used to acquire the synchronization timings is transmitted. Additionally, a communication device receiving multiple synchronization signals selects a synchronization signal based on the origin information corresponding to each synchronization signal. According to such a configuration, even if the UE 20 receives multiple synchronization signals from different types of source devices, the UE 20 is able to select a synchronization signal appropriately. Hereinafter, a diagrammatic process flow will be described with reference to FIG. 10, and then a specific example of origin information and a specific example of the selection of a synchronization signal using origin information will be described.

Figure 10:
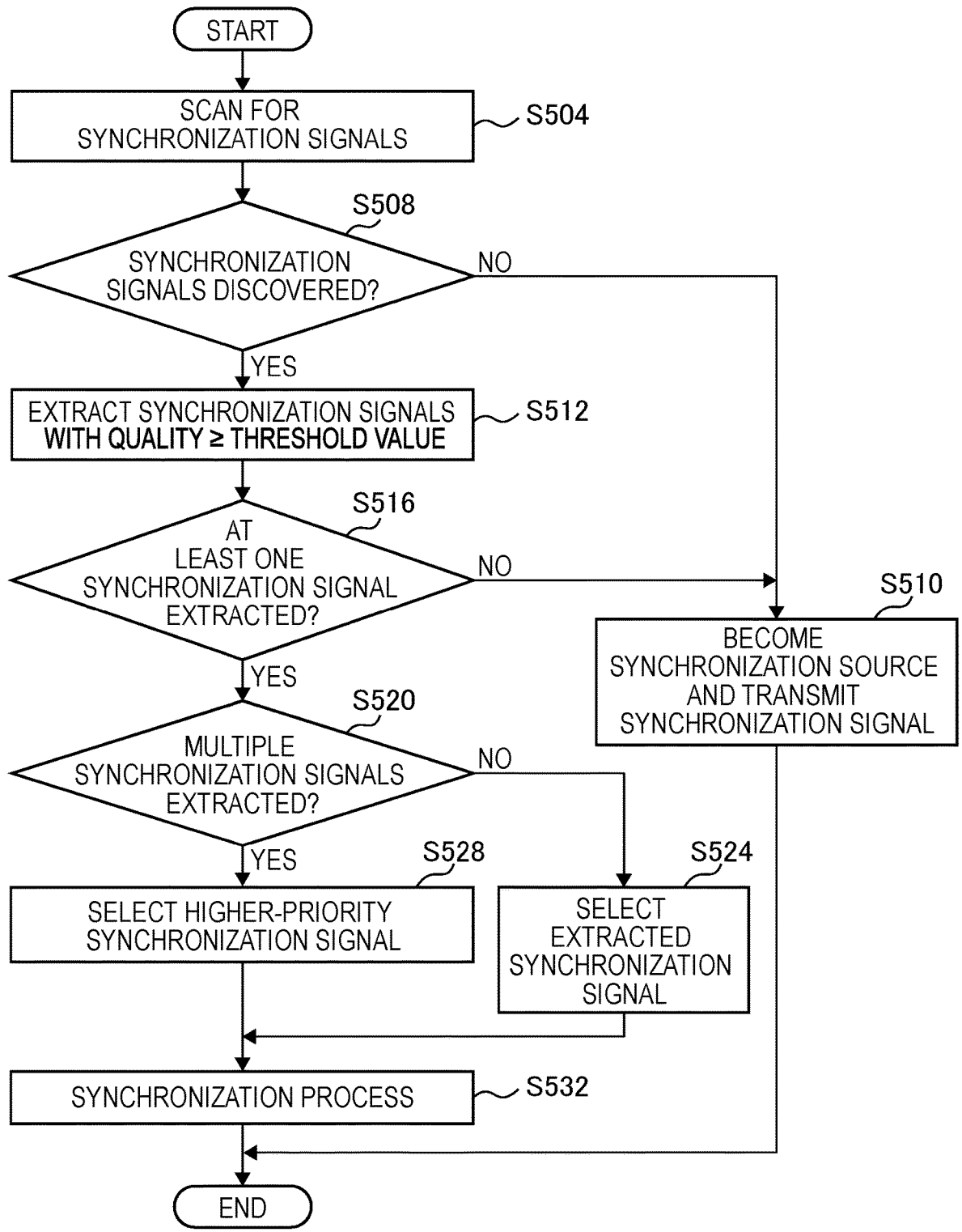
FIG. 10 is a flowchart illustrating a diagrammatic process flow of a second operation example.

FIG. 10 is a flowchart illustrating a diagrammatic process flow of a second operation example. As illustrated in FIG. 10, first, the communication unit 210 of the UE 20 scans for synchronization signals (S504). If a synchronization signal is not discovered by the scan (S508/no), the control unit 260 of the UE 20 decides that the UE 20 itself will be a source device, and controls the transmission of a synchronization signal from the communication unit 210 (S510).

On the other hand, if synchronization signals are discovered by the scan (S508/yes), the selection unit 240 extracts synchronization signals having a quality equal to or greater than a threshold value (S512). At this point, the selection unit 240 may also use origin information to extract synchronization signals having a quality equal to or greater than a threshold value. The determination of whether or not the quality is equal to or greater than a threshold value may be a determination of whether or not the number of interposing devices in the procedure of relaying synchronization timings discussed later exceeds a certain number, for example.

In S512, if no synchronization signal having a quality equal to or greater than a threshold value is extracted (S516/no), the control unit 260 of the UE 20 decides that the UE 20 itself will be a source device, and controls the transmission of a synchronization signal from the communication unit 210 (S510). Also, if only one synchronization signal having a quality equal to or greater than a threshold value is extracted (S516/yes, S520/no), the selection unit 240 selects the extracted synchronization signal. On the other hand, if multiple synchronization signals having a quality equal to or greater than a threshold value are extracted (S520/yes), the selection unit 240 uses origin information to select a higher-priority synchronization signal (S528). Subsequently, the synchronization processing unit 250 acquires synchronization timings using the synchronization signal selected by the selection unit 240 (S532).

—Origin Information—

Origin information is information indicating the origin of a synchronization signal used to acquire synchronization timings. The origin information includes information depending on the source device of the synchronization signal. For example, the origin information may include information indicating the type of source device, such as a GPS satellite, an eNB, an RSU, or a UE. Alternatively, the origin information may include identification information unique to the source device, such as a GNSS_ID, a cell ID, an Encrypted Mobile Subscriber Identity (EMSI), or a Radio Network Temporary ID (RNTI).

Furthermore, the origin information may include various information related to the origin of the synchronization signal. For example, the origin information may also include information indicating the procedure of relaying synchronization timings from the source device to the communication device that transmitted the synchronization signal. The information indicating the procedure of relaying synchronization timings may be number-of-interpositions information indicating the number of interposing devices in the above relaying procedure, information indicating the interposing devices in the above relaying procedure, or the like.

For example, the origin information may be expressed as (number of interposing devices: n)(source device)(interposing devices (n devices)). For example, if the number of interposing devices is 3, the source device is a GPS satellite (identity: 0), and an RSU (identity: 2) and a UE (identity: 3) are interposing, the origin information may be a bit map expressed as (3, 0, 2, 3)=11001011. Note that the origin information may also include communication type information, such as D2D public safety, D2D commercial, V2V, V2I, or V2P.

The method of transmitting the above origin information is not particularly limited. For example, the UE 20 may transmit origin information as system information regarding the PSBCH. Alternatively, the UE 20 may use information indicating the type of source device, which is an example of origin information, as a seed for generating a synchronization signal. For example, in the D2D communication mode, the UE 20 may use information indicating the type of source device as an ID for generating the SSSS. Alternatively, the UE 20 may use information indicating the type of source device as the root index of the PSSS. For reference, methods of generating the PSSS and the SSSS are indicated below. In a case where information indicating the type of source device is used as an ID for generating the SSSS, the information indicating the type of source device may be used as NID(1) and NID(2) below.

[Math. 1]

PSSS
   Sequence
      New root index u {26, 37}
         PD2DSSue_net: 26
         PD2DSSue_oon: 37

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

SSSS
   Sequence $$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

$$m_0 = m' \bmod 31$$

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor, q' = \lfloor N_{ID}^{(1)}/30 \rfloor$$

$$c_0(n) = \tilde{c}((n + N_{ID}^{(2)}) \bmod 31)$$

$$c_1(n) = \tilde{c}((n + N_{ID}^{(2)} + 3) \bmod 31)$$

—Utilization of Origin Information—

The selection unit 240 of the UE 20 selects a synchronization signal by using the origin information. Hereinafter, a specific example of the selection of a synchronization signal using origin information will be described.

1)

The following are examples of synchronization signals that the UE 20 may receive. Note that the number of hops indicated below corresponds to the number of interposing devices in the relaying procedure.

A. Source device=GPS satellite, number of hops=0 (direct reception from GPS satellite)
B. Source device=eNB, number of hops=0 (direct reception from eNB)
C. Transmitting device=RSU
C-1. Source device=GPS satellite, number of hops=1
C-2. Source device=eNB, number of hops=1
C-3. Source device=RSU, number of hops=1
C-4. Source device=UE, number of hops=1
C-5. Source device=transmitting device, number of hops=0
D. Transmitting device=UE
D-1. Source device=GPS satellite, number of hops=1
D-2. Source device=eNB, number of hops=1
D-3. Source device=RSU, number of hops=1
D-4. Source device=UE, number of hops=1
D-5. Source device=transmitting device, number of hops=0

For example, the selection unit 240 may select with the highest priority a synchronization signal for which the type of source device is the GPS satellite 40, and select with the next-highest priority a synchronization signal for which the type of source device is the eNB 30. Specifically, the selection unit 240 may select a synchronization signal according to the following priority ranking 1.

Priority ranking 1=(A)>(B)>(C-1)>(D-1)>(C-2)>(D-2)>(C-3)>(D-3)>(C-4)>(D-4)>(C-5)>(D-5)

Alternatively, the selection unit 240 may prioritize the selection of a synchronization signal with a low number of hops. Specifically, the selection unit 240 may select a synchronization signal according to either of the following priority rankings.

Priority ranking 2=(A)>(B)>(C-5)>(D-5)>(C-1)>(D-1)>(C-2)>(D-2)>(C-3)>(D-3)>(C-4)>(D-4)

Priority ranking 3=(A)>(B)>(C-5)>(D-5)>(C-1)>(C-2)>(D-1)>(D-2)>(C-3)>(D-3)>(C-4)>(D-4)

2)

As another example, if the origin information is expressed in a bit map format, the selection unit 240 of the UE 20 may compute a quality score from the bit map, and select the synchronization signal with the highest score. For example, the selection unit 240 may compute a score according to the following Formula 1.

[Math. 2]

$$\sum_{n=0}^{\text{Total hops}} \left( \frac{n+1}{\text{Total hops}+1} \right)(\text{Node score } n) \quad \text{(Formula 1)}$$

According to Formula 1 above, in a case in which synchronization timings are relayed in the order of GPS satellite→eNB→RSU→UE, the node score of the GPS satellite is "4", the node score of the eNB is "3", the node score of the RSU is "2", and the node score of the UE is "1", the score becomes "4.33" according to the calculation (1/3)*4+(2/3)*3+(3/3)*2. The score calculation method according to Formula 1 may be considered to be a method that places importance on the types of downstream devices in the relaying procedure.

On the other hand, the selection unit 240 may also use a score calculation method that places importance on the types of upstream devices in the relaying procedure. Such a calculation method is expressed like in the following Formula 2, for example.

[Math. 3]

$$\sum_{n=0}^{\text{Total hops}} \left( \frac{\text{Total hops}+1-n}{\text{Total hops}+1} \right)(\text{Node score } n) \quad \text{(Formula 2)}$$

According to Formula 2 above, in a case in which synchronization timings are relayed in the order of GPS satellite→eNB→RSU→UE, the node score of the GPS satellite is "4", the node score of the eNB is "3", the node score of the RSU is "2", and the node score of the UE is "1", the score becomes "6.67" according to the calculation (3/3)*4+(2/3)*3+(1/3)*2.

Note that the communication device that transmits a synchronization signal may also transmit, as the origin information, a score computed by a calculation method described with reference to Formula 1 and Formula 2 or the like. In a case of calculating the score on the side of the receiving UE 20, the same score calculation is performed on multiple UEs 20 for one transmitting communication device. On the other hand, in the case in which the transmitting communication device calculates and transmits the score, it is sufficient to perform the score calculation on only one communication device (namely, the transmitting communication device). Consequently, by having the transmitting communication device calculate and transmit the score, it is possible to moderate the load on the wireless communication system overall.

Additionally, the above score may also be used in the quality threshold value determination described with reference to S512.

In addition, the control unit 260 may also determine whether or not to transmit a synchronization signal after synchronization timings are acquired by the synchronization process, based on the origin information of the synchronization signal selected by the selection unit 240. For example, since the degradation of accuracy is a concern for a synchronization signal with a large number of hops, the control unit 260 may determine not to transmit a synchronization signal if the number of hops exceeds a threshold value. According to such a configuration, the prolonged propagation of a synchronization signal with degraded accuracy within the wireless communication system may be prevented.

—Application Example—

Next, an application example of the second operation example discussed above will be described. The present application example is a technology devised primarily by supposing a situation in which the synchronized states of multiple UEs 20 moving along the same route are lost around the same time. For example, if multiple UEs 20 synchronized to a synchronization signal transmitted from the GPS satellite 40 enter a tunnel around the same time, the synchronized states of the multiple UEs 20 may be lost around the same time. This point will be described with reference to FIG. 11.

Figure 11:
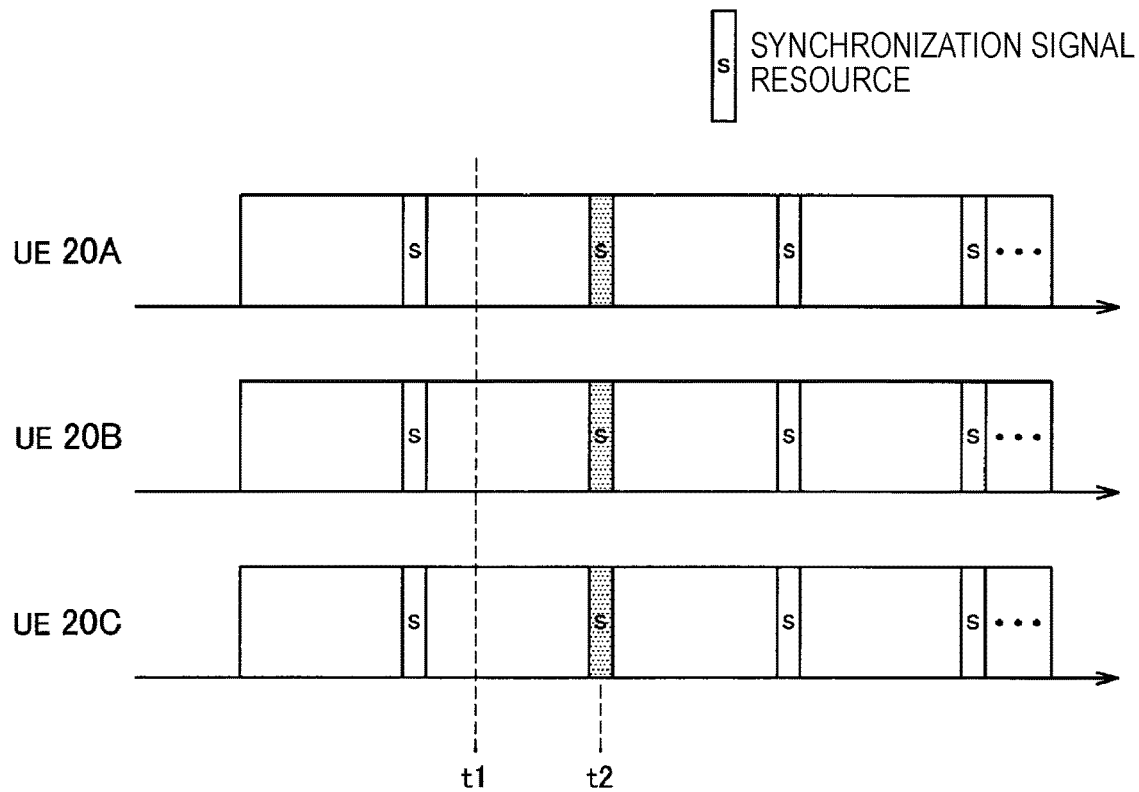
FIG. 11 is an explanatory diagram illustrating an operation example in a case in which the synchronized states of multiple UEs are lost around the same time.

FIG. 11 is an explanatory diagram illustrating an operation example in a case in which the synchronized states of multiple UEs 20 are lost around the same time. In a case in which the UEs 20A to 20C are synchronized to a synchronization signal transmitted from the same GPS satellite 40, as illustrated in FIG. 11, the UEs 20A to 20C operate in accordance with the same synchronization timings. Subsequently, if at time t1 the UEs 20A to 20C enter a tunnel and the synchronized states of the UEs 20A to 20C are lost, each of the UEs 20A to 20C may attempt to transmit a synchronization signal in accordance with the process of S510 illustrated in FIG. 10.

Herein, synchronization signal resources are mapped periodically (for example, on a 40 ms period) inside the frame, as illustrated in FIG. 11. For this reason, if the synchronized states of the UEs 20A to 20C are lost at time t1, the UEs 20A to 20C may conduct the transmission of a synchronization signal in the same synchronization signal resource arriving next at time t2.

However, if the UEs 20A to 20C transmit synchronization signals at the same time t2, each of the UEs 20A to 20C will have difficulty receiving the synchronization signals transmitted from the other UEs 20 among the UEs 20A to 20C.

Figure 12:
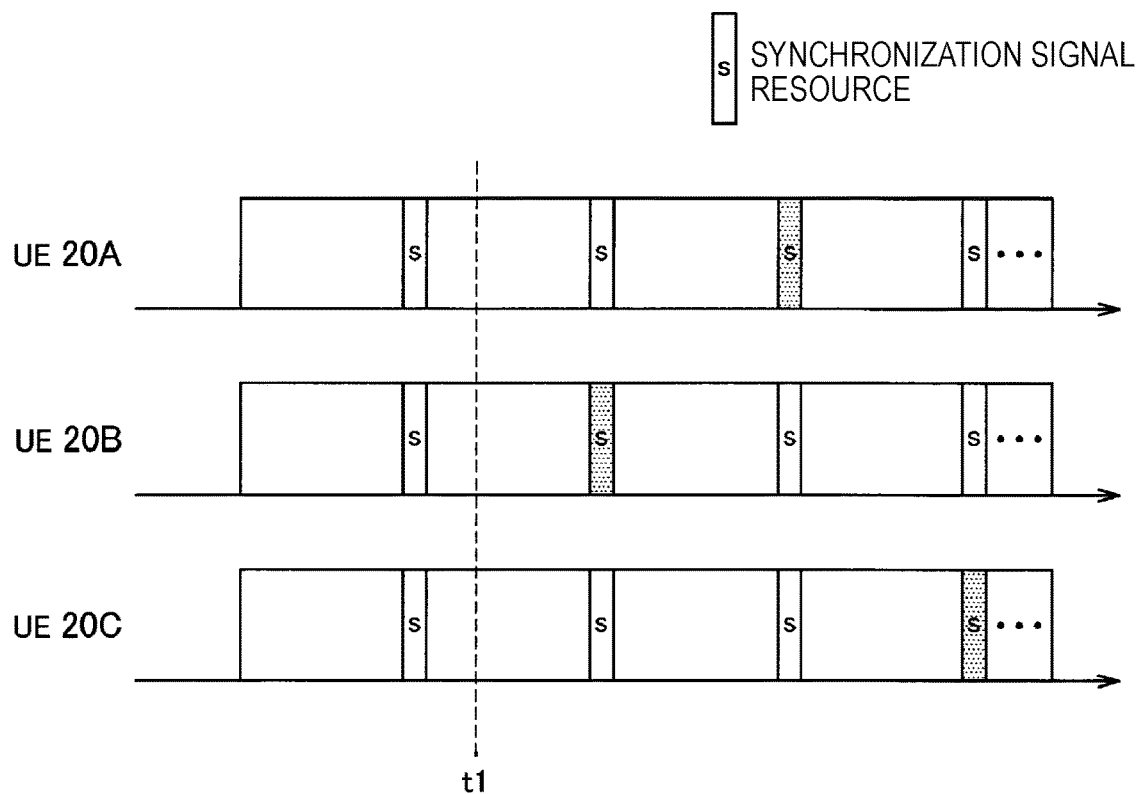
FIG. 12 is an explanatory diagram illustrating an operation example in a case in which the synchronized states of multiple UEs are lost around the same time.
Figure 13:
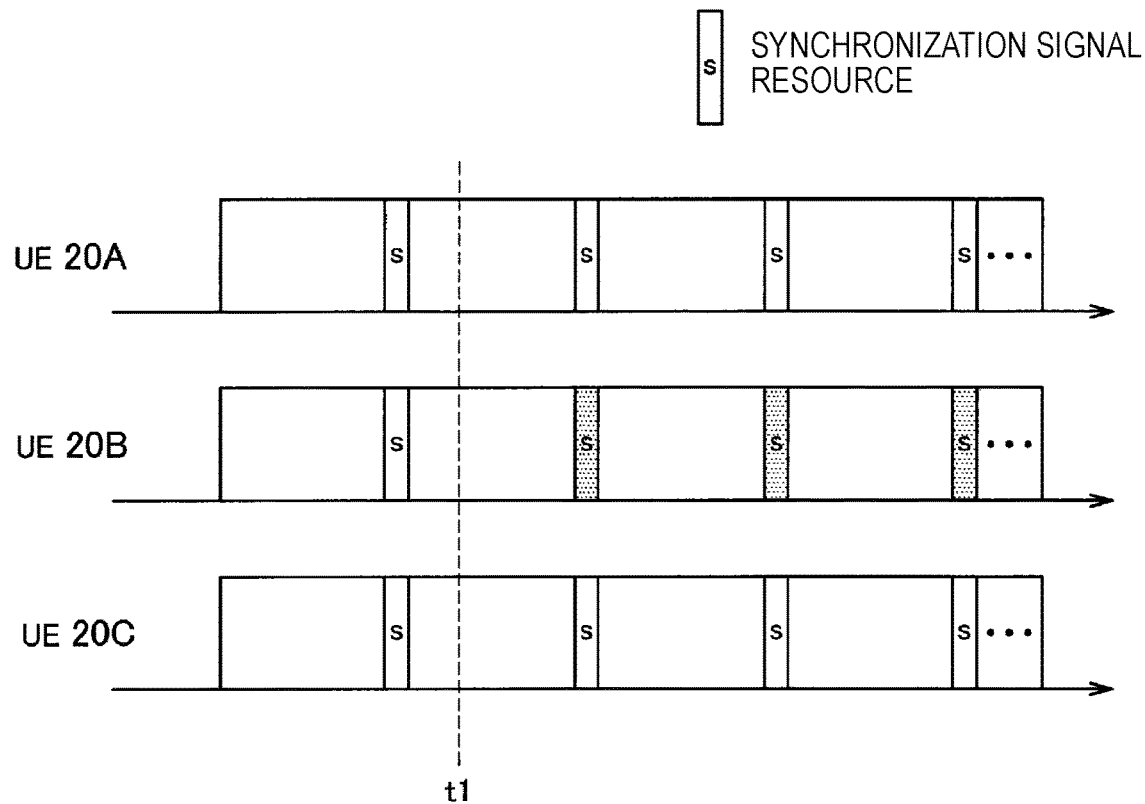
FIG. 13 is an explanatory diagram illustrating an operation example in a case in which the synchronized states of multiple UEs are lost around the same time.

Accordingly, in a case where the synchronized states of multiple UEs 20 are lost around the same time, the UE 20 according to the application example conducts the transmission of a synchronization signal at a different timing from other UEs 20. For example, as illustrated in FIG. 12, after time t1 in a case where the synchronized states of multiple UEs 20 are lost around the same time, the UE 20 according to the application example attempts to transmit a synchronization signal at a different timing. However, if the UE 20B transmits a synchronization signal first as illustrated in FIG. 12, the UEs 20A and 20C receive the synchronization signal, and thus, as illustrated in FIG. 13, the UEs 20A and 20C do not transmit synchronization signals, and instead synchronize to the synchronization signal transmitted by the UE 20B. According to such a configuration, in a case where the synchronized states of multiple UEs 20 based on a synchronization signal from the GPS satellite 40 or the eNB 30 are lost around the same time, it is possible to switch smoothly to synchronization and D2D communication among the UEs 20.

Note that the above timing control may be realized by various methods. For example, in a case where the synchronized state is lost, the control unit 260 may generate a random number, and control the transmission of a synchronization signal at a timing corresponding to the generated random number. In addition, the control unit 260 may also generate a random number for determining whether or not to transmit a synchronization signal in each synchronization signal resource, and transmit a synchronization signal in the synchronization signal resource corresponding to a case in which the random number satisfies a certain condition.

Additionally, the control unit 260 may also control the transmission of a synchronization signal at a timing corresponding to information included in the UE 20. For example, the UE 20 may decide the timing at which to transmit a synchronization signal according to (synchronization_signal_resource_number mod IMSI or RNTI). Alternatively, another communication device such as the eNB 30 or the RSU 50 may designate in advance the UE 20 to transmit a synchronization signal, and the designated UE 20 may transmit the synchronization signal. Note that another communication device such as the eNB 30 or the RSU 50 may also designate in advance to each UE 20 a timing at which to transmit a synchronization signal, and each UE 20 may wait until the designated timing before transmitting a synchronization signal.

3-3. Third Operation Example

The above thus describes a second operation example according to an embodiment of the present disclosure. Next, a third operation example according to an embodiment of the present disclosure will be described. The third operation example is a technology that enables the UE 20 to synchronize based on a GNSS signal transmitted from the GPS satellite 40, while also reducing power consumption in the UE 20.

—Introduction—

Since there are battery concerns about the UE 20, it is anticipated that the GNSS signal processing unit 220 will be activated and deactivated repeatedly. For this reason, it is difficult for the UE 20 to continually maintain synchronization based on a GNSS signal transmitted from the GPS satellite 40. On the other hand, even if the UE 20 is unable to receive a GNSS signal transmitted from the GPS satellite 40, the UE 20 is still able to share synchronization timings with the eNB 30 based on a synchronization signal from the eNB 30.

However, if a UE 20 with an active GNSS signal processing unit 220 conducts the synchronization process based on the GNSS signal, and a UE 20 with an inactive GNSS signal processing unit 220 conducts the synchronization process based on a synchronization signal transmitted from the eNB 30, there will be a mixture of UEs 20 synchronized to different types of source devices. From the perspective of network operation and management, it is desirable for the type of source device to which each UE 20 synchronizes to be unified to some degree.

The third operation example is a technology devised in light of the above circumstances. According to the third operation example, even a UE 20 with an inactive GNSS signal processing unit 220 is able to obtain synchronization timings according to a GNSS signal transmitted from the GPS satellite 40. Hereinafter, a method of realizing such a third operation example will be described specifically.

—Main Issue—

In the third operation example, the eNB 30 or the RSU 50 transmits an offset value indicating the time different between a synchronization timing obtained using the synchronization signal transmitted by the eNB 30 or the RSU 50, and a synchronization timing acquired based on a GNSS signal. At this point, a specific example of an offset value will be described with reference to FIG. 14.

Figure 14:
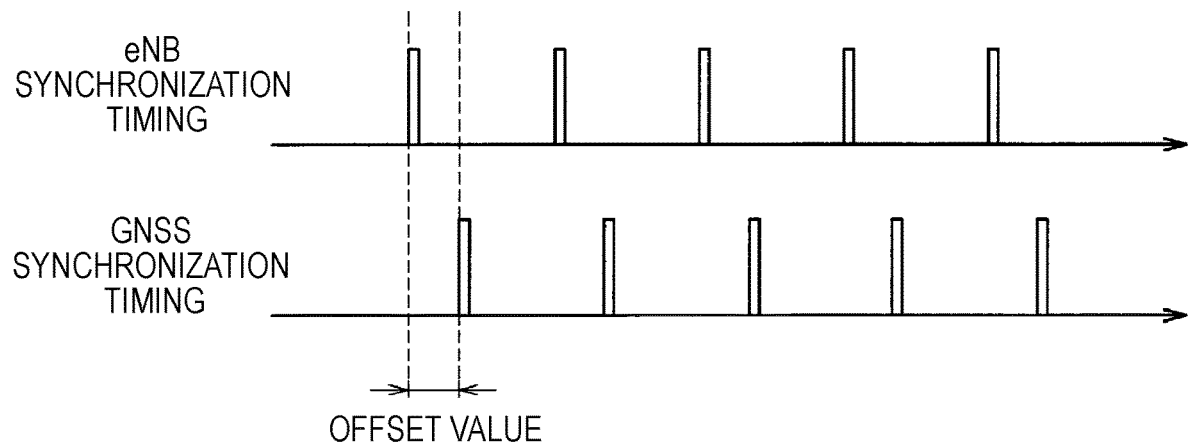
FIG. 14 is an explanatory diagram illustrating a specific example of an offset value.

FIG. 14 is an explanatory diagram illustrating a specific example of an offset value. As illustrated in FIG. 14, a synchronization timing obtained using a synchronization signal transmitted by the eNB 30 and a synchronization timing obtained using a GNSS signal arrive periodically. Herein, if the periods of both synchronization timings are the same, the time difference between both of the synchronization timings is also constant. Accordingly, in the present operation example, the eNB 30 or the RSU 50 transmits the time difference between both of the synchronization timings to the UE 20 as an offset value.

Subsequently, from the synchronization timing obtained using a synchronization signal transmitted by the eNB 30 or the RSU 50, the synchronization processing unit 250 of the UE 20 specifies, as the synchronization timing, a timing that has been time-shifted according to the above offset value. According to such a configuration, even while the GNSS signal processing unit 220 is inactive in the UE 20, the UE 20 still is able to obtain a synchronization timing obtained using the GNSS signal. As a result, it is possible to improve a mixed state of UEs 20 synchronized to different types of source devices.

Note that the eNB 30 or the RSU 50 may acquire the offset value by a variety of methods. Hereinafter, offset value acquisition methods will be described with reference to FIG. 15.

Figure 15:
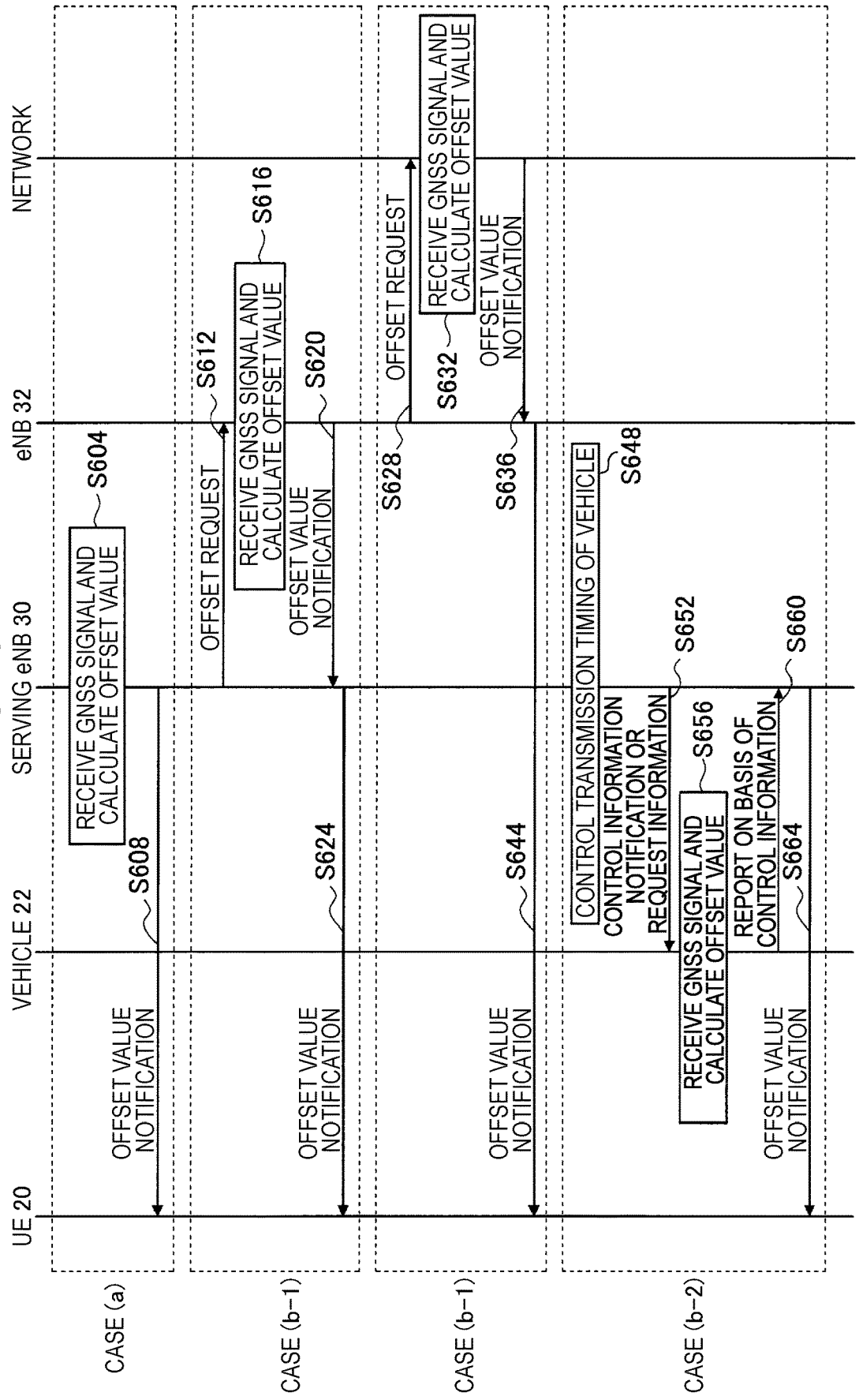
FIG. 15 is an explanatory diagram illustrating several methods by which an eNB or an RSU acquires an offset value.

FIG. 15 is an explanatory diagram illustrating several methods by which the eNB 30 or the RSU 50 acquires an offset value.

(a)

For example, if the serving eNB 30 or RSU 50 includes a GNSS signal processing unit, the serving eNB 30 or RSU 50 receives a GNSS signal to acquire a synchronization timing, and calculates the time difference between the acquired synchronization timing and its own synchronization timing as an offset value (S604). Subsequently, the serving eNB 30 or RSU 50 transmits the above offset value to the UE 20 (S608).

(b)

On the other hand, cases in which the serving eNB 30 or RSU 50 does not include a GNSS signal processing unit are also conceivable. In such cases, the serving eNB 30 or RSU 50 may acquire the offset value by cooperating with another communication device.

(b-1)

For example, the serving eNB 30 or RSU 50 may request an offset value from another eNB 32 that includes a GNSS signal processing unit (S612), and the other eNB 32 may calculate the offset value (S616). Subsequently, the serving eNB 30 or RSU 50 receives the offset value from the other eNB 32 (S620), and transmits the offset value to the UE 20 (S624).

However, in the case in which the serving eNB 30 or RSU 50 and the other eNB 32 are not synchronized, if the serving eNB 30 or RSU 50 simply transmits the offset value received from the other eNB 32 directly, a correct synchronization timing will not be obtained in the UE 20. Accordingly, in the case in which the serving eNB 30 or RSU 50 and the other eNB 32 are not synchronized, the serving eNB 30 or RSU 50 may recalculate the offset value by adding together the offset value received from the other eNB 32 and the synchronization shift from the other eNB 32. Alternatively, the eNB 32 may request an offset value from the network (S628), receive an offset value calculated on the network (S632, S636), and transmit this offset value to the UE 20 (S644).

(b-2)

As another method, the serving eNB 30 or RSU 50 may also acquire an offset value calculated by a vehicle 22 or a UE 20 including the function of a GNSS signal processing unit. For example, the serving eNB 30 may request the calculation of an offset value from a vehicle 22 including the function of a GNSS signal processing unit (S648, S652), receive the offset value calculated by the vehicle 22 from the vehicle 22 (S656, S660), and transmit the offset value to the UE 20 (S664).

Note that the serving eNB 30 may request the calculation of an offset value only from a specific communication device from among communication devices such as the UE 20 or the vehicle 22, or request the calculation of an offset value from all communication devices. If offset values are received from multiple communication devices as a result, the serving eNB 30 may also calculate the average of the multiple offset values as the offset value to report to the UE 20. Alternatively, the serving eNB 30 may store the position information and the offset value of each communication device in association with each other. In this case, the serving eNB 30 may set a different offset value for each area. For example, the serving eNB 30 may unicast or multicast the offset value calculated by a communication device belonging to each area to UEs 20 within the corresponding area. Since the offset value is expected to be different depending on the position of the UE 20, with the above configuration, the UE 20 becomes able to specify more accurately a synchronization timing based on a GNSS signal.

Alternatively, if the serving eNB 30 performs the transmission of an offset value in a certain field of a frame (such as the MIB or the SIB, for example), a UE 20 including the function of the GNSS signal processing unit 220 may also determine whether or not to perform the calculation of an offset value based on whether or not an offset value is set in the certain field.

For example, if an offset value is not set in the certain field, the control unit 260 of the UE 20 may control the calculation and the transmission of an offset value. Alternatively, if an offset value is not set in the certain field, the control unit 260 of the UE 20 may control whether or not to perform the calculation and the transmission of an offset value randomly, based on probability information designated in advance from the eNB 30, for example. According to such a configuration, if an offset value is not set in the certain field, it is possible to avoid a situation in which all UEs 20 including the function of the GNSS signal processing unit 220 perform the calculation and the transmission of an offset value.

Note that the eNB 30 may also set the above probability information based on the number of UEs 20 belonging to the cell. For example, the eNB 30 may set the above probability information so that the offset value transmission probability decreases as the number of UEs 20 belonging to the cell increases. According to such a configuration, the eNB 30 is able to obtain a number of offset values close to a certain number, irrespective of the number of UEs 20 belonging to the cell.

Alternatively, the eNB 30 may also use the SIB or the DCI, for example, to designate in advance the UE 20 to perform the calculation and the transmission of an offset value.

—Supplemental Remarks—

The above supposes a situation in which the UE 20 is able to receive a synchronization signal transmitted by the eNB 30 or the RSU 50. However, situations in which the UE 20 is unable to receive a synchronization signal transmitted by the eNB 30 or the RSU 50 are also anticipated. In this way, if the UE 20 becomes unable to receive a synchronization signal transmitted by the eNB 30 or the RSU 50, the UE 20 may also forcibly activate the GNSS signal processing unit 220. Alternatively, to realize the seamless handover of a synchronization signal, if the UE 20 seems likely to become unable to receive a synchronization signal transmitted by the eNB 30 or the RSU 50, such as if the received signal strength falls below a threshold value, for example, the UE 20 may forcibly activate the GNSS signal processing unit 220. Since situations in which the UE 20 is unable to receive a synchronization signal transmitted from the eNB 30 or the RSU 50 are not major in terms of overall usage situations, the above configuration does not pose a problem from the perspective of power consumption.

4. APPLICATION EXAMPLES

The technology of the present disclosure is applicable to various products. For example, the eNB 30 described above is an example of a base station, and the base station may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station may be realized as any other types of base stations such as a NodeB and a base transceiver station (BTS). The base station may include a main body (that is also referred to as a base station device) configured to control radio communication, and one or more remote radio heads (RRH) disposed in a different place from the main body. Additionally, various types of terminals to be discussed later may also operate as the base station by temporarily or semi-permanently executing a base station function.

For example, the UE 20 may be realized as a mobile terminal such as a smartphone, a tablet personal computer (PC), a notebook PC, a portable game terminal, a portable/dongle type mobile router, and a digital camera, or an in-vehicle terminal such as a car navigation device. The UE 20 may also be realized as a terminal (that is also referred to as a machine type communication (MTC) terminal) that performs machine-to-machine (M2M) communication. Furthermore, the UE 20 may be a radio communication module (such as an integrated circuit module including a single die) mounted on each of the terminals.

4-1. Application Examples Regarding Base Station

First Application Example

Figure 16:
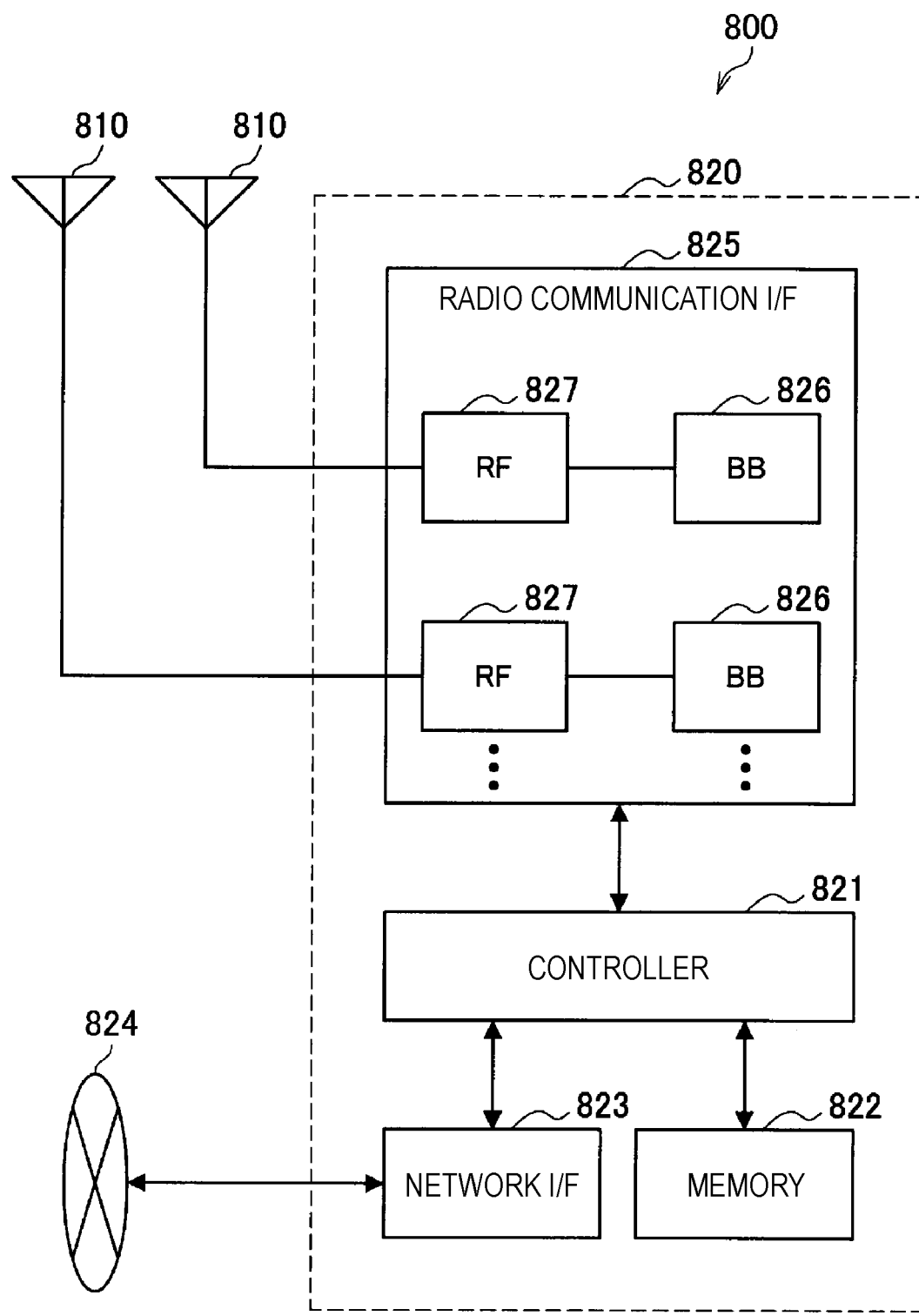
FIG. 16 is a block diagram illustrating a first example of a schematic configuration of an eNB.

FIG. 16 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 16. For example, the multiple antennas 810 may be compatible with multiple frequency bands used by the eNB 800. Note that although FIG. 16 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. In addition, the controller 821 may have logical functions of performing control such as radio resource control, radio bearer control, mobility management, admission control, and scheduling. In addition, the control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an Si interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP) for example). The BB processor 826 may have a part or all of the above-described logical functions instead of the controller 821. The BB processor 826 may be a memory that stores a communication control program, or a module that includes a processor and a related circuit configured to execute the program. Updating the above program may allow the functions of the BB processor 826 to be changed. The above module may be a card or a blade that is inserted into a slot of the base station device 820. Alternatively, the module may also be a chip that is mounted on the above card or the above blade. Meanwhile, the RF circuit 827 may include, for example, a mixer, a filter, an amplifier, and the like and transmits and receives radio signals via the antenna 810.

The radio communication interface 825 may include the multiple BB processors 826, as illustrated in FIG. 16. For example, the multiple BB processors 826 may be compatible with multiple frequency bands used by the eNB 800. In addition, the radio communication interface 825 may include the multiple RF circuits 827, as illustrated in FIG. 16. For example, the multiple RF circuits 827 may be compatible with multiple antenna elements. Note that although FIG. 16 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 17:
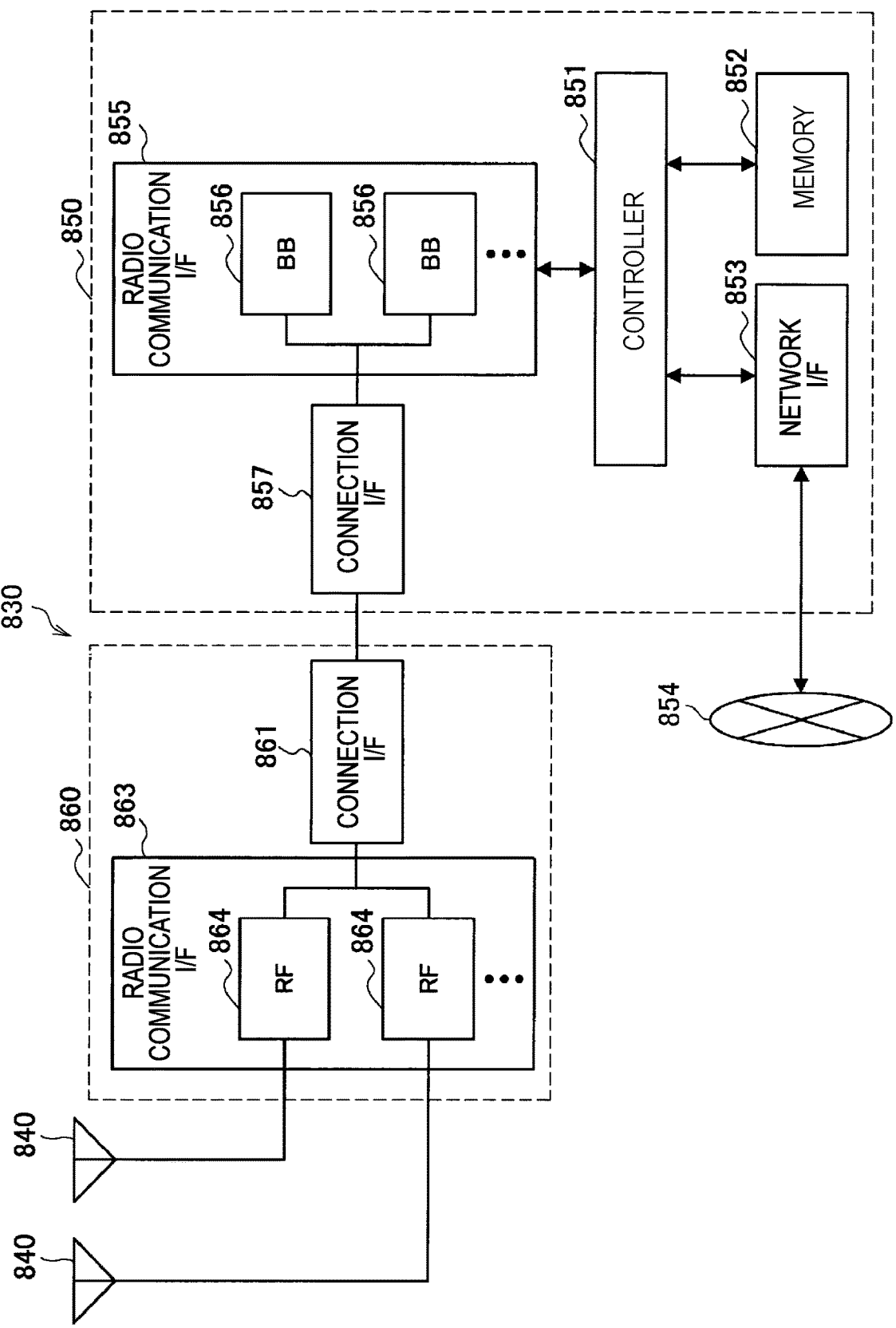
FIG. 17 is a block diagram illustrating a second example of a schematic configuration of an eNB.

FIG. 17 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. In addition, the base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 17. For example, the multiple antennas 840 may be compatible with multiple frequency bands used by the eNB 830. Note that although FIG. 17 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 16.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856 or the like. The BB processor 856 is the same as the BB processor 826 described with reference to FIG. 16, except the BB processor 856 is connected to the RF circuit 864 of the RRH 860 via the connection interface 857. The radio communication interface 855 may include the multiple BB processors 856, as illustrated in FIG. 17. For example, the multiple BB processors 856 may be compatible with multiple frequency bands used by the eNB 830. Note that although FIG. 17 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

In addition, the RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864 or the like. The RF circuit 864 may include, for example, a mixer, a filter, an amplifier, and the like, and transmits and receives radio signals via the antenna 840. The radio communication interface 863 may include multiple RF circuits 864, as illustrated in FIG. 17. For example, the multiple RF circuits 864 may support multiple antenna elements. Note that although FIG. 17 illustrates the example in which the radio communication interface 863 includes the multiple RF circuits 864, the radio communication interface 863 may also include a single RF circuit 864.

In the eNB 800 and the eNB 830 illustrated in FIGS. 16 and 17, the communication unit 310 described using FIG. 5 may be implemented in the radio communication interface 825 as well as the radio communication interface 855 and/or the radio communication interface 863. Also, at least some of these functions may also be implemented in the controller 821 and the controller 851.

4-2. Application Examples Regarding UE

First Application Example

Figure 18:
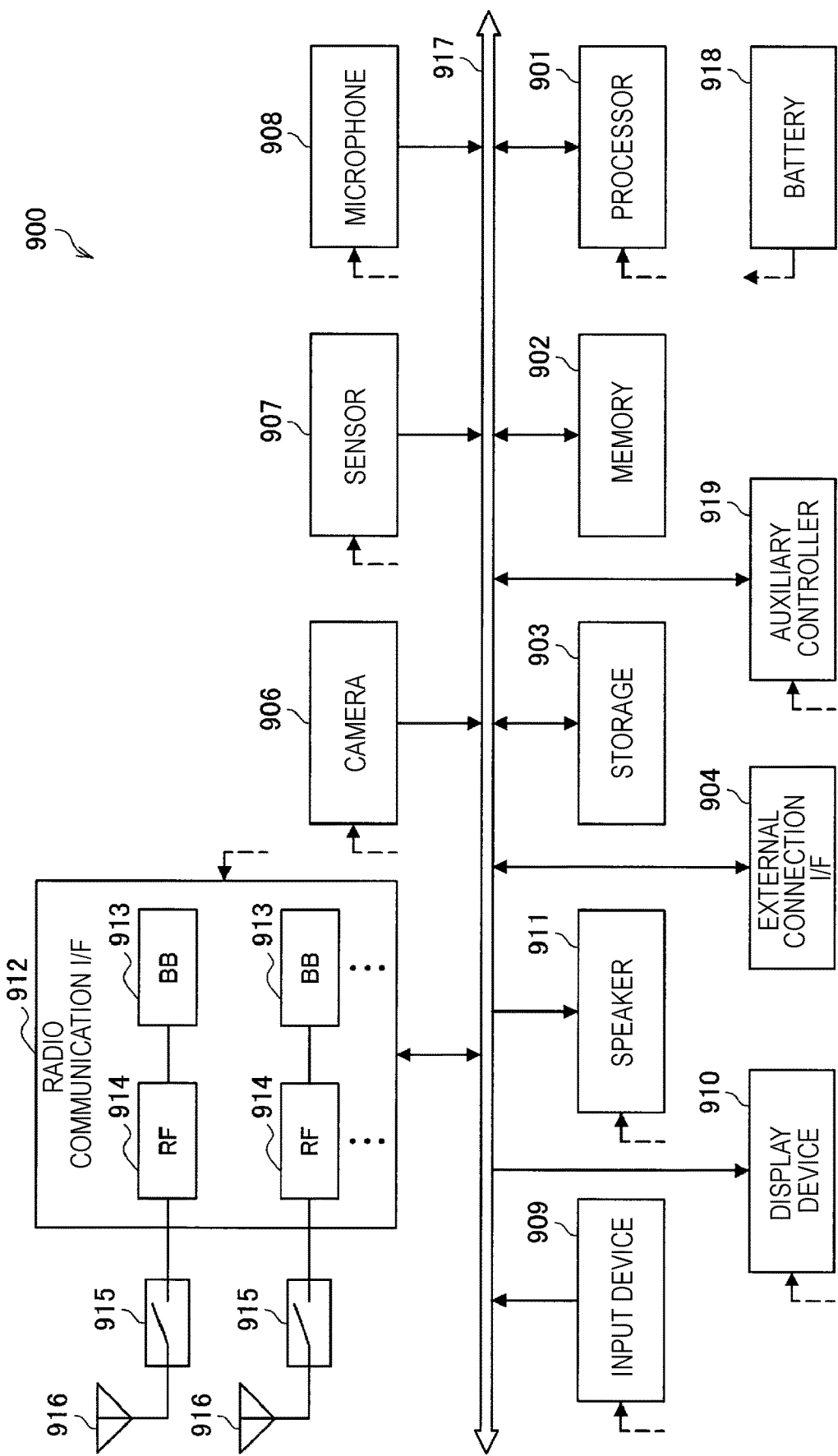
FIG. 18 is a block diagram illustrating an example of a schematic configuration of a smartphone.

FIG. 18 is a block diagram illustrating an example of a schematic configuration of a smartphone 900 that is an example of the UE 30 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, a switch, or the like, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913, an RF circuit 914, and the like. The BB processor 913 may perform, for example, encoding/decoding, modulating/demodulating, multiplexing/demultiplexing, and the like, and performs various types of signal processing for radio communication. Meanwhile, the RF circuit 914 may include, for example, a mixer, a filter, an amplifier, and the like, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 18. Note that although FIG. 18 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 18. Note that although FIG. 18 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 18 via feeder lines, which are partially shown as dashed lines in the figure. The auxiliary controller 919 operates a minimum necessary function of the smartphone 900, for example, in a sleep mode.

In the smartphone 900 illustrated in FIG. 18, the communication unit 210 described using FIG. 5 may be implemented in the radio communication interface 912. Also, at least some of these functions may also be implemented in the processor 901 or the auxiliary controller 919.

Second Application Example

Figure 19:
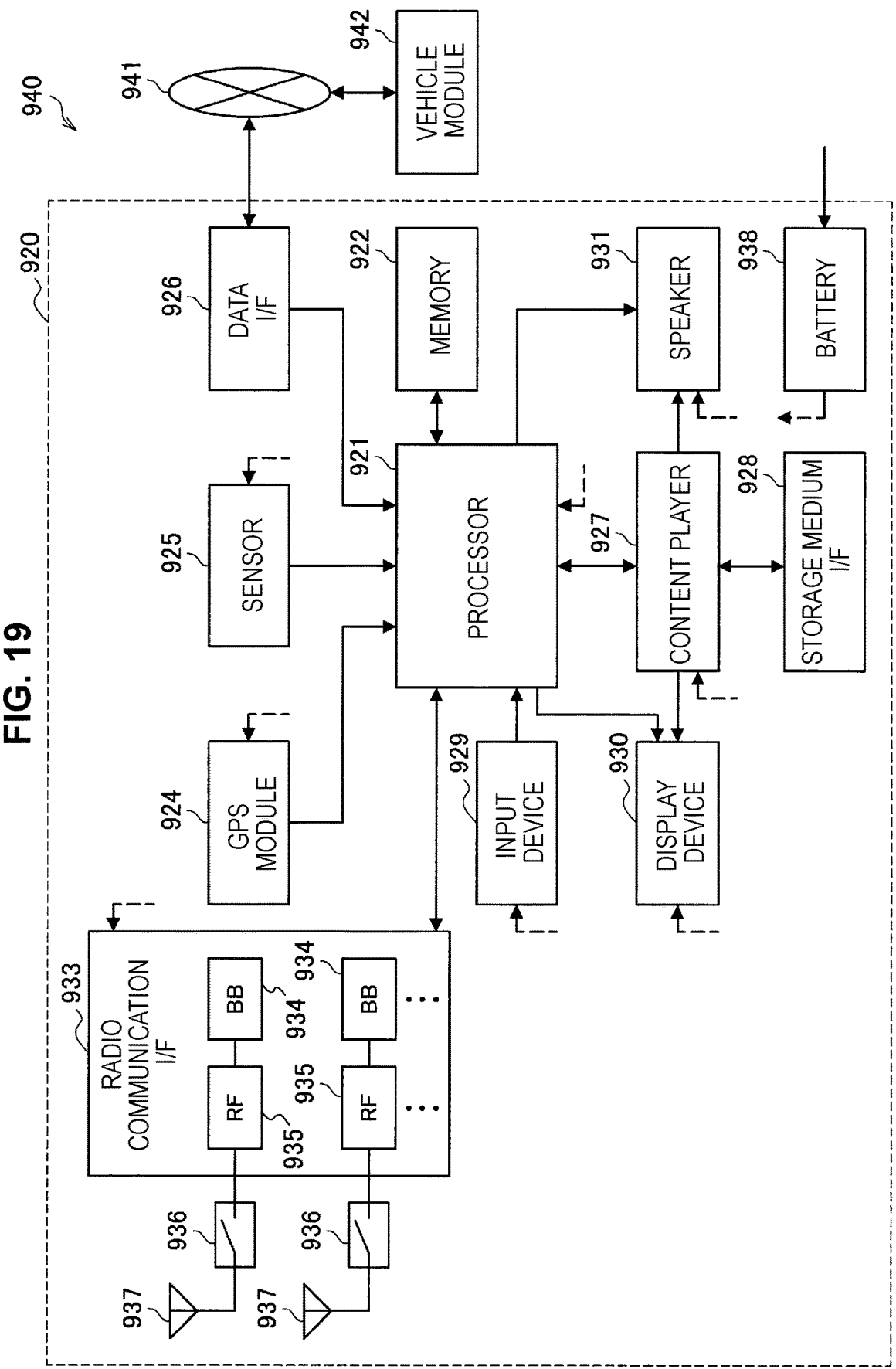
FIG. 19 is a block diagram illustrating an example of a schematic configuration of a car navigation device.

FIG. 19 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934, an RF circuit 935, and the like. The BB processor 934 may perform, for example, encoding/decoding, modulating/demodulating, multiplexing/demultiplexing, and the like, and performs various types of signal processing for radio communication. Meanwhile, the RF circuit 935 may include, for example, a mixer, a filter, an amplifier, and the like, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 19. Note that although FIG. 19 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 19. Note that although FIG. 19 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to each block of the car navigation device 920 illustrated in FIG. 19 via feeder lines that are partially shown as dashed lines in the figure. In addition, the battery 938 accumulates power supplied form the vehicle.

In the car navigation device 920 illustrated in FIG. 19, the communication unit 210 described using FIG. 5 may be implemented in the radio communication interface 933. Also, at least some of these functions may also be implemented in the processor 921.

In addition, the technology of the present disclosure may also be realized as an in-vehicle system (or a vehicle) 940 including one or more blocks of the above car navigation device 920, the in-vehicle network 941, and a vehicle module 942. The vehicle module 942 generates vehicle data such as vehicle speed, engine speed, and trouble information, and outputs the generated data to the in-vehicle network 941.

5. CONCLUSION

As described above, according to the first operation example and the second operation example of the present disclosure, the UE 20 is able to select a synchronization signal appropriately and conduct a synchronization process. In addition, according to the third operation example of the present disclosure, it is possible to synchronize the UE 20 based on a GNSS signal transmitted from the GPS satellite 40, while also reducing power consumption in the UE 20.

It should be understood by those skilled in the art that various modifications, combinations, sub-combinations and alterations may occur depending on design requirements and other factors insofar as they are within the scope of the appended claims or the equivalents thereof.

For example, the respective steps in the processes of the UE 20 and the eNB 30 in this specification are not strictly limited to being processed in a time series following the order described as sequence diagrams herein. For example, the respective steps in the processes of the UE 20 and the eNB 30 may be processed in an order that differs from the order described as sequence diagrams herein, and furthermore may be processed in parallel.

Also, it is possible to create a computer program for causing hardware such as the CPU, ROM, and RAM built into the above UE 20 and the eNB 30 to exhibit the same functionality as the respective components of the UE 20 and the eNB 30 discussed earlier. Also, a storage medium having such a computer program stored therein is also provided.

In addition, the advantageous effects described in this specification are merely for the sake of explanation or illustration, and are not limiting. In other words, instead of or in addition to the above advantageous effects, technology according to an embodiment of the present disclosure may exhibit other advantageous effects that are clear to persons skilled in the art from the description of this specification. For example, a communication device simultaneously implementing the functions from the first operation example to the third operation example discussed earlier may also be provided.

Additionally, the present technology may also be configured as below.

(1)

A communication device including:

a selection unit configured to select a synchronization signal from respective synchronization signals received from two or more other devices on a basis of origin information that is acquired by communication with another device and that indicates an origin of a synchronization signal used for acquisition of synchronization timing in the other device; and a synchronization processing unit configured to acquire synchronization timing using the synchronization signal selected by the selection unit.

(2)

The communication device according to (1), in which the origin information includes information corresponding to a source device serving as a source of a synchronization signal for the acquisition of the synchronization timing in the other device.

(3)

The communication device according to (2), in which the origin information includes information that indicates a procedure of relaying the synchronization timing from the source device to the other device.

(4)

The communication device according to (3), in which the origin information includes number-of-interpositions information that indicates a number of interposing devices in the procedure of relaying the synchronization timing from the source device to the other device.

(5)

The communication device according to any one of (2) to (4), in which the selection unit recognizes a source device corresponding to a synchronization signal received from the other device on a basis of the origin information, and prioritize, among a synchronization signal corresponding to a first source device and a synchronization signal corresponding to a second source device according to a system that provides service in a wider range compared with the first source device, selection of the synchronization signal corresponding to the second source device.

(6)

The communication device according to (5), in which the first source device is a cellular base station, and the second source device is a GPS satellite.

(7)

The communication device according to (4), in which the selection unit recognizes a number of interposing devices in a relaying procedure corresponding to a synchronization signal received from the other device on a basis of the number-of-interpositions information, and prioritize, among a synchronization signal corresponding to a first relaying procedure and a synchronization signal corresponding to a second relay procedure having a larger number of interposing devices compared with the first relaying procedure, selection of the synchronization signal corresponding to the first relaying procedure.

(8)
The communication device according to (1), in which
the origin information includes score information calculated on a basis of the origin of the synchronization signal used for acquisition of the synchronization timing in the other device, and
the selection unit selects the synchronization signal on a basis of a magnitude relationship of score information corresponding to a synchronization signal received from the other device.

(9)
The communication device according any one of (1) to (8), further including
a control unit configured to determine whether or not to transmit a synchronization signal after the acquisition of the synchronization timing by the synchronization processing unit on a basis of origin information of a synchronization signal selected by the selection unit.

(10)
The communication device according to (9), in which
the origin information indicates a number of interposing devices in the procedure of relaying the synchronization timing from a source device to a transmission source device of a synchronization signal selected by the selection unit, the source device serving as a source for a synchronization signal for acquisition of synchronization timing in the transmission source device, and
the control unit determines not to transmit the synchronization signal in a case where a number of the devices exceeds a threshold value.

(11)
The communication device according to any one of (1) to (10), further including
an acquisition unit configured to acquire an ID for generating a synchronization signal received from the other device as the origin information.

(12)
The communication device according to any one of (1) to (10), further including
an acquisition unit configured to acquire the origin information from system information to be transmitted from the other device.

(13)
The communication device according to (2), in which
the selection unit decides which synchronization signal corresponding to origin information to select in accordance with a movement condition of the communication device.

(14)
The communication device according to (13), in which
the selection unit uses a lane ID that indicates which road the communication device has moved along as a movement condition of the communication device.

(15)
The communication device according to (1), in which
the selection unit decides which synchronization signal corresponding to origin information to select in accordance with an instruction from an external device.

(16)
The communication device according to (1), in which
the selection unit decides which synchronization signal corresponding to origin information to select using information to be provided from an external device.

(17)
A communication device including:
a synchronization processing unit configured to acquire synchronization timing on a basis of reception of a synchronization signal; and
a control unit configured to control transmission of the synchronization signal after the acquisition of the synchronization timing by the synchronization processing unit, in which
the control unit further controls transmission of origin information that indicates an origin of the synchronization signal used for the acquisition of the synchronization timing.

(18)
A communication method including:
selecting, by a processor, a synchronization signal from respective synchronization signals received from two or more other devices on a basis of origin information that is acquired by communication with another device and that indicates an origin of a synchronization signal used for acquisition of synchronization timing in the other device; and
acquiring synchronization timing using the selected synchronization signal.

(19)
A communication method including:
acquiring synchronization timing on a basis of reception of a synchronization signal;
controlling transmission of a synchronization signal after the acquisition of the synchronization timing; and
controlling, by a processor, transmission of origin information that indicates an origin of a synchronization signal used for the acquisition of the synchronization timing.

REFERENCE SIGNS LIST

20 UE
22 vehicle
40 GPS satellite
50 RSU
210 communication unit
220 Signal processing unit
230 storage unit
240 selection unit
250 synchronization processing unit
260 control unit
310 communication unit
330 storage unit
360 control unit

The invention claimed is:
1. A communication device comprising:
a selection unit configured to select a synchronization signal from respective synchronization signals received from two or more other devices on a basis of origin information that is acquired by communication with another device and that indicates an origin of a synchronization signal used for acquisition of synchronization timing in the other device; and
a synchronization processing unit configured to acquire synchronization timing using the synchronization signal selected by the selection unit, wherein
the origin information includes information corresponding to a source device serving as a source of a synchronization signal for the acquisition of the synchronization timing in the other device,
the selection unit recognizes a source device corresponding to a synchronization signal received from the other device on a basis of the origin information, and priori- tize, among a synchronization signal corresponding to a first source device and a synchronization signal corresponding to a second source device according to a system that provides service in a wider range compared with the first source device, selection of the synchronization signal corresponding to the second source device, the first source device is a cellular base station, and the second source device is a GPS satellite.

2. The communication device according to claim 1, wherein the origin information includes information that indicates a procedure of relaying the synchronization timing from the source device to the other device.

3. The communication device according to claim 2, wherein the origin information includes number-of-interpositions information that indicates a number of interposing devices in the procedure of relaying the synchronization timing from the source device to the other device.

4. The communication device according to claim 3, wherein the selection unit recognizes a number of interposing devices in a relaying procedure corresponding to a synchronization signal received from the other device on a basis of the number-of-interpositions information, and prioritize, among a synchronization signal corresponding to a first relaying procedure and a synchronization signal corresponding to a second relay procedure having a larger number of interposing devices compared with the first relaying procedure, selection of the synchronization signal corresponding to the first relaying procedure.

5. The communication device according to claim 1, wherein the origin information includes score information calculated on a basis of the origin of the synchronization signal used for acquisition of the synchronization timing in the other device, and the selection unit selects the synchronization signal on a basis of a magnitude relationship of score information corresponding to a synchronization signal received from the other device.

6. The communication device according to claim 1, further comprising a control unit configured to determine whether or not to transmit a synchronization signal after the acquisition of the synchronization timing by the synchronization processing unit on a basis of origin information of a synchronization signal selected by the selection unit.

7. The communication device according to claim 6, wherein the origin information indicates a number of interposing devices in the procedure of relaying the synchronization timing from a source device to a transmission source device of a synchronization signal selected by the selection unit, the source device serving as a source for a synchronization signal for acquisition of synchronization timing in the transmission source device, and the control unit determines not to transmit the synchronization signal in a case where a number of the devices exceeds a threshold value.

8. The communication device according to claim 1, further comprising an acquisition unit configured to acquire an ID for generating a synchronization signal received from the other device as the origin information.

9. The communication device according to claim 1, further comprising an acquisition unit configured to acquire the origin information from system information to be transmitted from the other device.

10. The communication device according to claim 2, wherein the selection unit decides which synchronization signal corresponding to origin information to select in accordance with a movement condition of the communication device.

11. The communication device according to claim 10, wherein the selection unit uses a lane ID that indicates which road the communication device has moved along as a movement condition of the communication device.

12. The communication device according to claim 1, wherein the selection unit decides which synchronization signal corresponding to origin information to select in accordance with an instruction from an external device.

13. The communication device according to claim 1, wherein the selection unit decides which synchronization signal corresponding to origin information to select using information to be provided from an external device.

14. A communication method comprising:

selecting, by a processor, a synchronization signal from respective synchronization signals received from two or more other devices on a basis of origin information that is acquired by communication with another device and that indicates an origin of a synchronization signal used for acquisition of synchronization timing in the other device; and acquiring synchronization timing using the selected synchronization signal, wherein the origin information includes information corresponding to a source device serving as a source of a synchronization signal for the acquisition of the synchronization timing in the other device, the selecting includes recognizing a source device corresponding to a synchronization signal received from the other device on a basis of the origin information, and prioritize, among a synchronization signal corresponding to a first source device and a synchronization signal corresponding to a second source device according to a system that provides service in a wider range compared with the first source device, selection of the synchronization signal corresponding to the second source device, the first source device is a cellular base station, and the second source device is a GPS satellite.

* * * * *